Feb. 23, 1926. 1,574,139
F. L. O. WADSWORTH
SPRING SUSPENSION FOR VEHICLES
Filed Feb. 21, 1921 4 Sheets-Sheet 1
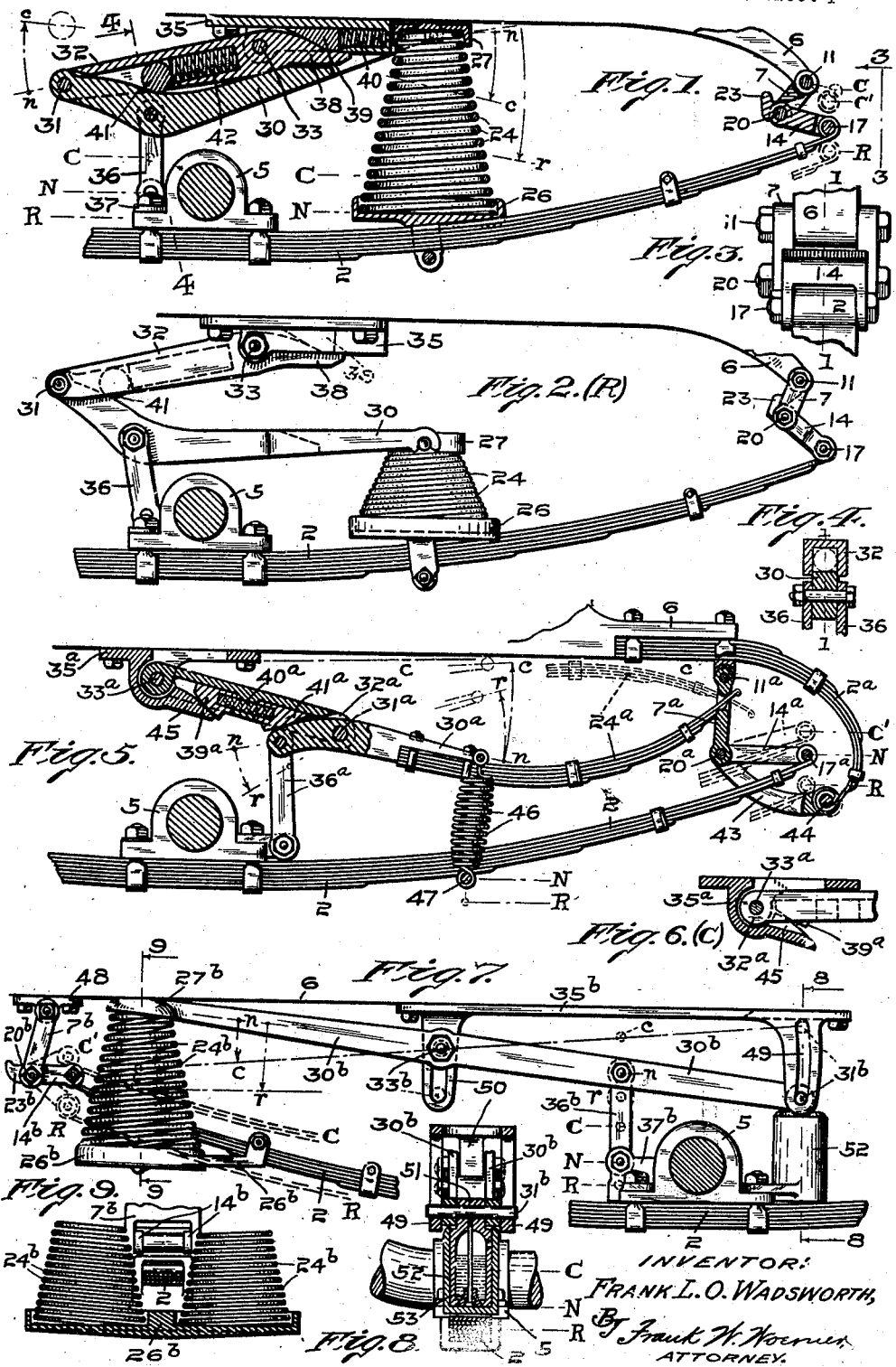
INVENTOR:
FRANK L. O. WADSWORTH,
By Frank W. Woerner
ATTORNEY.

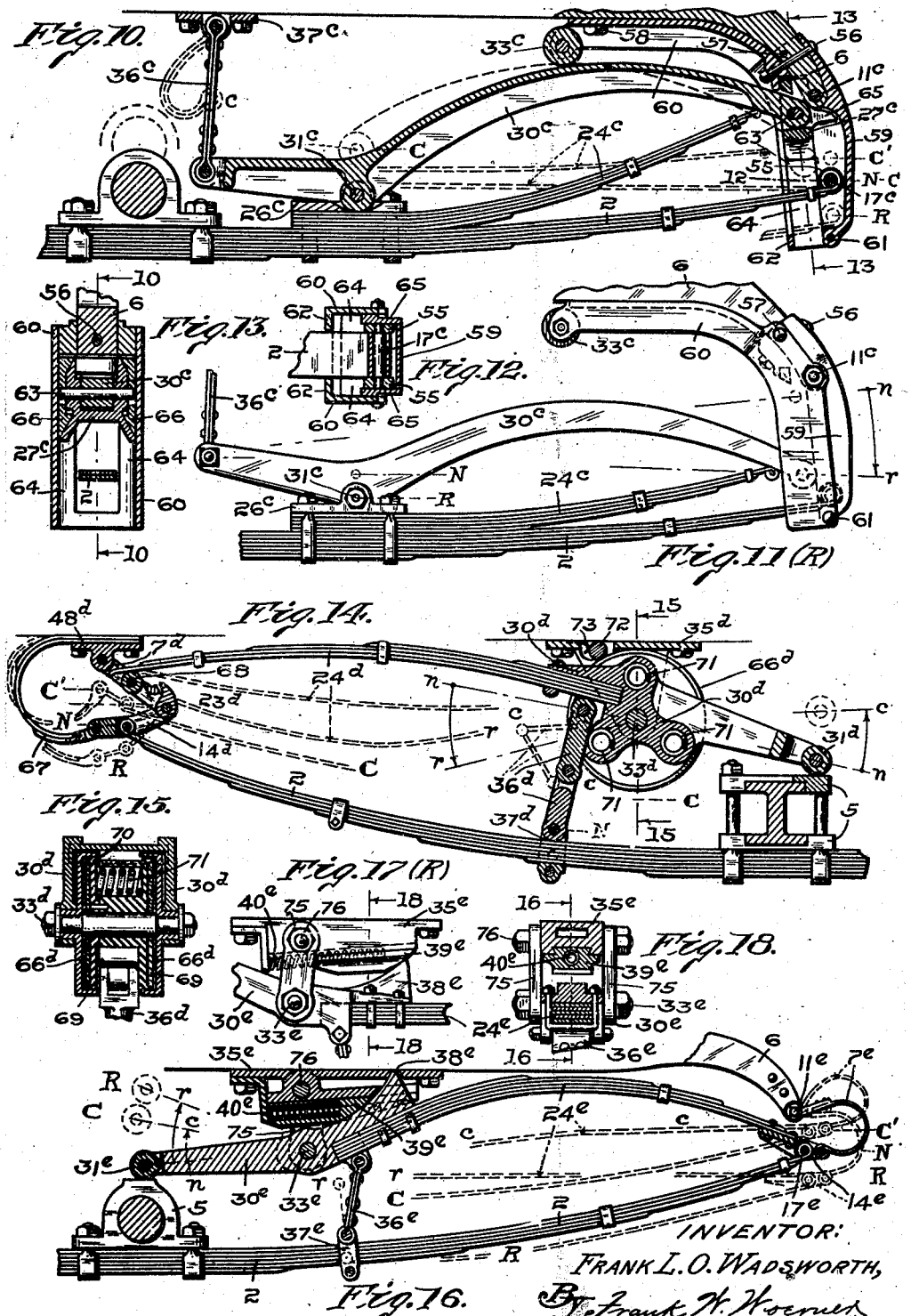

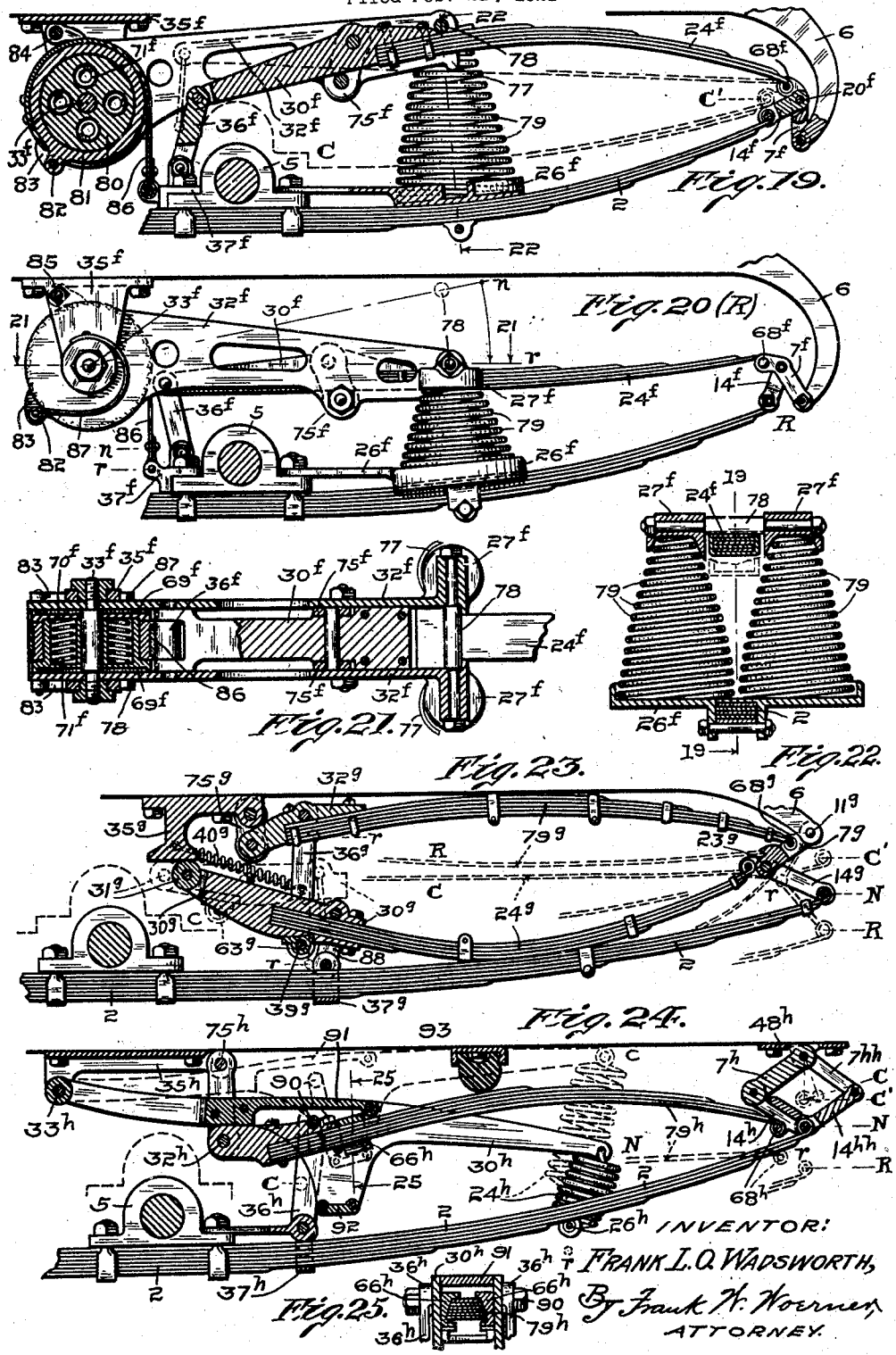

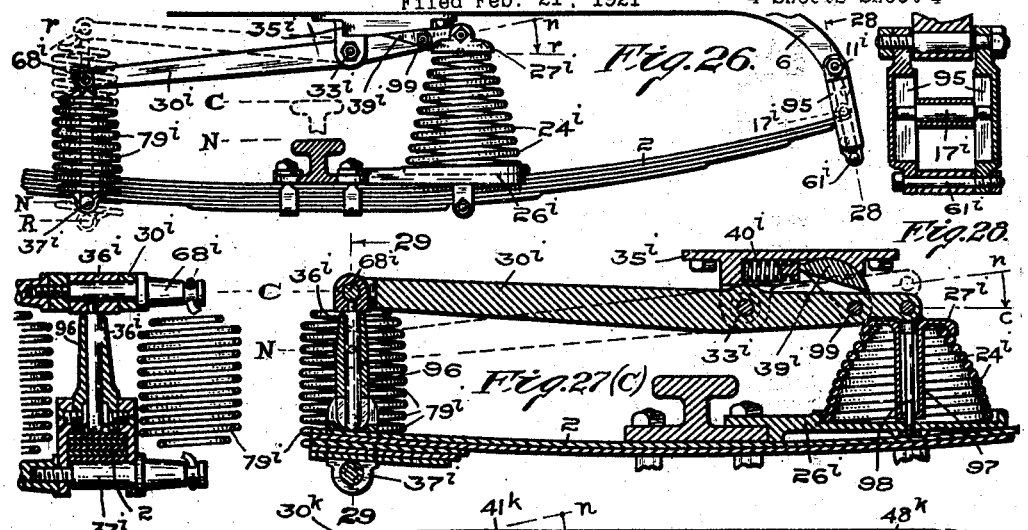
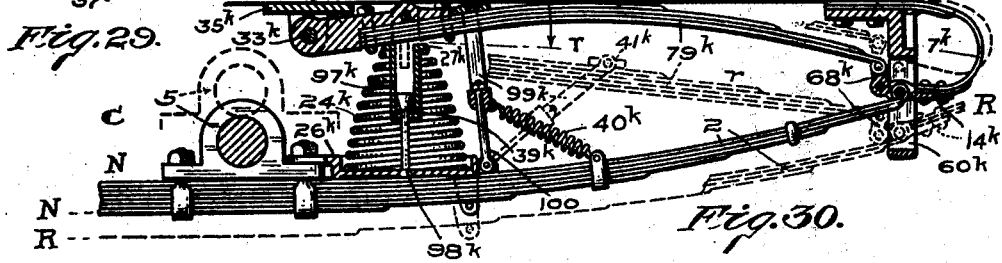
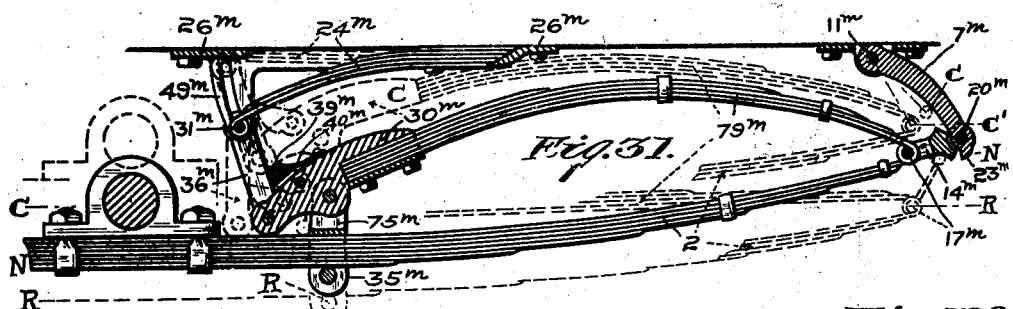
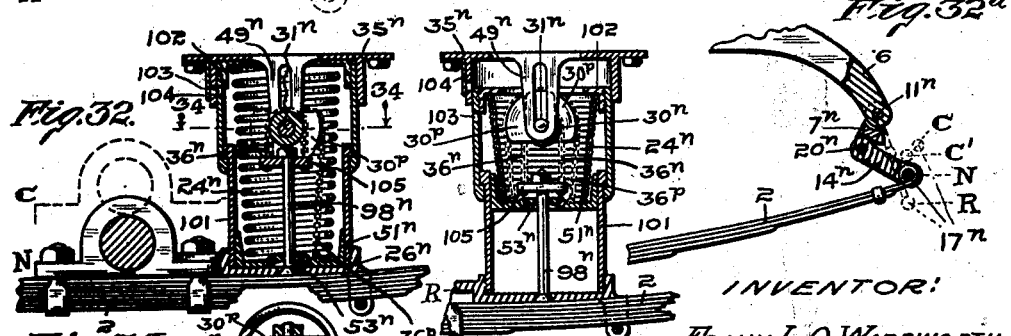
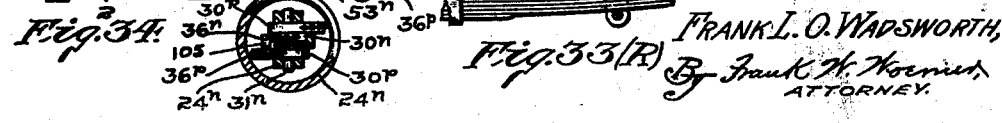

Patented Feb. 23, 1926.

1,574,139

UNITED STATES PATENT OFFICE.

FRANK L. O. WADSWORTH, OF PITTSBURGH, PENNSYLVANIA.

SPRING SUSPENSION FOR VEHICLES.

Application filed February 21, 1921. Serial No. 446,579.

*To all whom it may concern:*

Be it known that I, FRANK L. O. WADSWORTH, a citizen of the United States, residing at Pittsburgh, in the county of Allegheny and State of Pennsylvania, have invented certain new and useful Improvements in Spring Suspensions for Vehicles, of which the following is a specification.

My invention relates to improvements in shock absorbing devices which are particularly designed to supplement the action of the usual forms of spring suspension systems for the bodies of automobiles or other wheeled vehicles. Organizations of this character may be divided into two general groups; one group comprising those types and forms of apparatus in which the supplemental elements of the system act in parallel with the main spring members and serve only to reinforce and stiffen the action of the latter in resisting either compressive shocks or rebound stresses; and another group of devices in which the supplemental, or secondary, springs—or other equivalent cushioning elements—are inserted between some portion, or portions, of the primary suspension springs and the part, or parts, of the vehicle frame or chassis to which said members are ordinarily attached directly; and in which, therefore, the supplemental and the main suspension members act in series with one another. This second group of organizations—which are generally designated as supplemental-suspension systems—present certain advantages over the first mentioned organizations, which are usually referred to as supplemental-reinforcement systems; the most important of these advantages being the capacity of the supplemental-suspension elements to resist and cushion the effects of the minor shocks and jars that cannot be taken up and absorbed by the stiffer main spring and to thus greatly increase the sensitiveness and "easy riding" qualities of the suspension organization as a whole. But these advantages are attained at the sacrifice of that characteristic which makes the supplemental-reinforcement systems particularly useful, viz, the capacity of the added secondary elements to increase the load carrying capacity of the main spring members and to also resist or damp or otherwise restrain the normally free elastic oscillations of those primary members.

One of the generic purposes of my present invention is to provide a new type of complemental, or of supplemental-complemental, suspension system, which presents the more desirable and advantageous characteristics of both the reinforcement and the supplemental-suspension types of organization; i. e., to provide a combination of main spring and secondary spring elements which are connected at times in series and at other times in parallel; and which therefore cooperate effectively in both cushioning and absorbing the effect of minor shocks and jars, and in also resisting and restraining the excessive flexures and oscillations that tend to occur when the system is subjected to unusual loads or abnormal stresses.

Another important object of this invention is the provision of a type of complemental suspension organization, of the character just indicated, which is capable, not only of efficiently resisting and cushioning both the minor and the major shocks of compression, but of also quickly and effectively restraining and checking the back throw or recoil of the elastic or resilient members from their compressed positions, and thus eliminating, or very substantially reducing, the disagreeable and ofttimes dangerous rebound and "tossing" of the body parts when the vehicle is being driven over rough pavements.

A further specific object of my present improvements is to provide the complemental suspension organizations hereinbefore generally described with means for preventing any substantial lateral displacement of the vertically oscillating body and running gear parts; and thereby preventing both side sway or "rolling" and end rocking or "pitching" of the tonneau on its axle mountings. The preventation of side sway or cross "rolling", of the vehicle body is of great importance in the case of heavy high speed cars; because any such movement—particularly when it is accompanied by a rebound or excessive upthrow of the suspended body—is highly unpleasant, and may be dangerous when the vehicle is being driven around corners at a high speed, or over a laterally tilted or sloping road surface.

Other characteristic features and objects of particular embodiments of my generic invention will be made apparent, to those skilled in this art, by the examination of the various illustrative examples of my improved type of organization which are depicted in the accompanying drawings and hereinafter more fully described. All of these features may be either conjointly utilized in a single exemplification of my invention, or may be used separately, or to such extent as desired, in different embodiments thereof; and it will therefore be understood that the various forms of construction herein disclosed are to be considered only as typical forms of my improved complementary suspension system, and are not to be regarded as limiting the mechanical scope of that system.

In the drawings, which constitute an essential part of the present specification, Figs. 1 to 4 inclusive show one form of my invention as it may be used in conjunction with an ordinary side leaf spring support for a rear axle. Fig. 1 is a longitudinal vertical section on the central plane of the system—e. g., the planes 1—1 of Figs. 3 and 4—Fig. 2 is a side elevation of the same system showing the parts in the position which they assume on a rebound or upthrow of the elastic members above the normal or static load position of Fig. 1; Fig. 3 is an end view of the parts just to the left of the plane 3—3 of Fig. 1; and Fig. 4 is a partial cross-section on the plane 4—4 of the first figure.

Fig. 5 is a vertical sectional view, similar to Fig. 1, showing a second embodiment of my invention—the normal load position of the main and supplemental spring elements being depicted in full lines, and the compressed and expanded (or rebound) portions of those members being indicated in part in dotted lines—and Fig. 6 is a partial sectional view of certain parts of this construction when subjected to maximum load stress.

Figs. 7, 8 and 9 illustrate a third application of my invention to the side leaf spring support of a front axle of an automobile or similar vehicle. In these illustrations, Fig. 7 is a side elevation of the organization as it appears when subjected to normal load stresses; Fig. 8 is a cross section on the plane 8—8 of Fig. 7; and Fig. 9 is a similar section on the plane 9—9 thereof.

Fig. 10 is a vertical sectional view—on the central plane 10—10 of Fig. 13—of another exemplification of my improved complemental suspension system with the parts in the normal load position of static equilibrium; Fig. 11 is a partial side elevation of this same construction with the primary and secondary suspension members in the position of extreme rebound; Fig. 12 is a detail cross section on the horizontal plane 12—N—C of Fig. 10; and Fig. 13 is another cross-section on the plane 13—13 of Fig. 10.

Fig. 14 is a vertical sectional view—similar to that of Fig. 10—showing a further application of my improvements to a front side leaf spring member of a vehicle chassis; the static load position of the parts being indicated in full lines and the extreme compression and extreme rebound positions of the spring members being indicated, in part, by dotted lines. Fig. 15 is a detail cross-section on the plane 15—15 of Fig. 14.

Figs. 16, 17 and 18 depict still another embodiment of my invention. The first of these figures is a sectional elevation through the central longitudinal plane of the main spring member (e. g., the plane 16—16 of Fig. 18); the second figure is a side elevation of a portion of this construction, and shows the parts thereof displaced from the normal load position shown in Fig. 16, to a position of abnormal rebound or recoil; and the third figure is a detail cross-section on the plane 18—18 of Fig. 17.

Figs. 19 to 22 inclusive illustrate a seventh typical exemplification of my present improvements. In this illustration Fig. 19 is another sectional elevation on the central plane of the main side leaf spring element (e. g., on the plane 19—19 of Fig. 22); Fig. 20 is a side elevation, showing the parts displaced from the position of static equilibrium (Fig. 19) to the position of extreme recoil or expansion; Fig. 21 is a horizontal section on the plane 21—21 of Fig. 20; and Fig. 22 is a partial vertical section on the plane 22—22 of Fig. 19.

Fig. 23 is a composite illustration of another embodiment of the present invention. The full lines of this figure show the parts in the position of static equilibrium (i. e., of normal load); and the two sets of dotted lines show the primary and secondary spring members both in the position of extreme compression and in the reverse position of abnormal rebound.

Fig. 24 is a central sectional view—similar to the corresponding views of Figs. 1, 5, 10, 14, 16, 19 and 23—of still another form of my improved complemental suspension organization; and it shows in full lines the position of the parts under normal load and in dotted lines the corresponding position under an increased kinetic load or compressive shock. Fig. 25 is a detail cross sectional view on the plane 25—25 of Fig. 24.

Figs. 26 to 29 inclusive, depict still another application of my improved complemental suspension combination to the rear axle support of a truck or other heavy vehicle. In these illustrations Fig. 26 is a side elevation of the construction and shows the parts in normal load position; Fig. 27 is a central sectional elevation showing the spring suspension elements in the position which they assume under a severe compressive shock; Fig. 28 is an enlarged section on the plane 28—28 of Fig. 26; and Fig. 29 is a vertical section on the plane 29—29 of Fig. 27.

Figs. 30 and 31 are central vertical sections (similar to those shown in Fig. 23) of two additional exemplifications of my improvements as they may be utilized in conjunction with the ordinary side leaf spring supports of a front axle.

Figs. 32–32ᵃ, 33 and 34 are three sectional views of a modified form of my invention and show respectively: 1st, the parts of the combination in the position of normal load or static equilibrium, 2nd, the same parts in the position of extreme rebound or expansion, and 3rd, a detail section on the plane 34—34 of Fig. 32.

In the following detail description, the same, or similar, reference characters are always used, as far as practicable, to designate analogous or corresponding parts of the different exemplary embodiments of my improvements.

Considering first the construction illustrated in Figs. 1 to 4 inclusive: 2 indicates a main side leaf spring which is pivotally attached at its inner end (not shown) to the vehicle body, in the usual manner, and is bolted at its center to the main axle block 5. The outer end of this spring is ordinarily coupled to the body member 6 by means of longitudinally rigid or solid shackle links that are pivoted, at one end, to the coiled eye of the main spring 2, and at the other end to the said member 6; but in the application of my invention—and as a part thereof—these rigid links are replaced by a vertically flexible connection, which permits this part of the main spring to move bodily up and down, through a certain distance, with respect to the body, but which is so constructed as to prevent any relative sidewise play or displacement of the two connected parts. In the form shown in Figs. 1 and 3 this vertically flexible but laterally rigid coupling comprises a broad H-shaped frame 7, that is pivoted at its upper end on the body shackle bolt 11, and a rigid U-shaped link 14, that is pivoted at its lower forked end on the main spring eye bolt 17, and a long pintle or hinge pin bolt 20 that connects the adjacent extremities of the said frame and link. A certain range of relatively free movement, of the outer end of the main spring and the body, is permitted by the hinge action of the two pivotally connected members 7—14; but this range is restricted; in one direction by the contact engagement of the link 14, with the lower side of the triangular cross bar of the upper frame 7 (see dotted line position C' of Fig. 1); and, in the other direction, by the reciprocal engagement of the link bar extension or stop 23, with the opposite side of this same cross bar (see dotted line position R of Fig. 1, or full line position of Fig. 2). During this free vertical movement of the connected main spring and body members the outer part of the primary suspension element is not subjected to any flexural strain, and therefore assumes its initial or unstressed form; but as soon as there is a contact engagement between the connector elements 7 and 14, the latter are locked against further hinge movement in the same direction; and the locked parts then act as a solid or vertically rigid shackle link, and communicate the body load to the free end of the main spring 2. The latter member is thus brought into play to elastically resist further movement of the shackled parts either toward or away from each other.

The other part or portion of my invention—which cooperates with the coupling connection, 17—14—20—23, in controlling and complementing the action of the main spring 2—comprises a secondary spring-unit interposed between the vehicle body and the relatively stiff central portion of the primary spring, and acting, first in series and then in parallel therewith, to successively cushion and absorb not only the minor oscillations and vibrations, but also the abnormal and excessive kinetic stresses and shocks of rough road travel. In this first described exemplification the secondary or auxiliary unit comprises a volute or frusto-conical coil spring 24, which is supported on a main spring seat 26, and is engaged, at its upper end, by the head 27 that is pivotally mounted between the forked ends of a lever member 30. This lever member 30 is, in turn, pivotally connected, at its opposite extremity 31, to a second lever 32, which is rotatably mounted, at 33, in the slotted block 35 that is bolted to the body frame or tonneau. The first lever element is also connected, at an intermediate part in its length, with the axle bracket 5, by means of the pair of links 36—36 and the pintle block 37; and the second lever 32 is provided with an extension arm 38 that is adapted to engage—in the normal load and rebound position of the parts—with the lower face of the block 35 (see full line positions Figs. 1 and 2).

The essential features of operation of the mechanism above described, are as follows: In the normal load position of the parts the adjacent faces of the two levers 30 and 32 are in contact engagement at median portions of their length, and the outer forked ends of the first lever are also engaged by the body sill, thereby preventing any further expansion of the supplemental spring 24. The latter element is thus confined, between the heads 26 and 27, under a sufficient initial tension to carry that part of the load that is ordinarily transmitted to the outer end of the main spring 2. When the system is subjected to an increased kinetic load stress, or compressive shock, the body and axle parts move toward each other; and the thrust of the link connections 36, rocks the two engaged levers 30 and 32, as a unit, on the cross bolt 33; thereby compressing the supplemental spring 24 between the oppositely moving heads 26 and 27, and interposing a continually increasing secondary spring resistance to the approach of the said parts. During the first part of this movement the outer end of the main spring 2 may move freely toward the body bracket 6 without any elastic flexure of this part of the primary suspension member; and the minor kinetic stresses and shocks are therefore taken up entirely by the highly sensitive and elastic coil spring 24 which acts as a supplemental series suspension for the free end of the main spring. But as soon as the movement has carried the outer eye of the primary spring to the position, C', the link coupling elements 7—14 are locked on each other; and any further approach of the body and axle parts is now resisted not only by the continued lever-flexure of the auxiliary coil spring 24, but also by the progressively augmented bending of the outer part of the main spring 2. During this later portion of the movement the primary and secondary suspension members therefore act in parallel, to reinforce and complement each other, in quickly restraining and absorbing the effects of excessive load stresses and abnormal or unusual shocks of road travel. When the closing movement has proceeded to such a point that the lever system, 30—31—32, has been rocked through the extreme angle n—c (see Fig. 1) the further flexure of the spring supports is arrested by the engagement of the connected ends of the levers with the body sill of the tonneau, (see dotted lines at left of Fig. 1), thereby preventing rupture, or injury, of the coil 24 by undue compression. As the members return to the first position of static equilibrium (N) the part of the load stress carried, in parallel, by the outer end of the primary suspension member 2, is gradually transferred to the secondary suspension coil 24; thereby permitting that part of the main spring to again assume its initial unflexed form. When a rebound or expansion movement occurs, the body and axle parts separate from one another without, at first, imposing any reverse bending on the main spring; but the link connections 36 now act as tension members and rock the lever 30 downwardly on the pivot bolt 31—(the lever 32 being prevented from moving downwardly by the contact engagement between the parts 35 and 38)—thereby again compressing the secondary suspension spring 24 against its main spring seat 26. The relative position of the pivot bolts 31 and 33, with respect to the link connections 36, is such that the ratio between the bodily movement of separation of the suspended parts and the angular movement of the spring-compressing lever 30 is much greater than in the reverse closing movement of the system; and the restraining effect of the secondary suspension spring 24, on rebound or upthrow of the elastically supported parts, is correspondingly greatly augmented. This increased restraint will in general be sufficient to arrest the expansion of the system before the free outer end of the main spring has reached the rebound position, R, in which it has been again actively coupled to the body bracket by the locking of the linkage, 7—14—20, into a vertically rigid shackle. But the link parts, 7 and 23, may be so proportioned, as to arrest the vertically free movement of the eye 17, at any stage of compression of the supplemental spring 24; and when this arrest takes place the further opening or expansion of the elastically coupled members is resisted jointly by the continued positive flexure of the secondary spring and the concurrent negative or reverse bending of the primary spring. The rebound action of the combination therefore involves the same sequence of series and parallel cooperations of the supplemental and main spring members, as is characteristic of the compression action of the system.

The various elements of structure already described may be used by themselves, in the manner above explained; but I sometimes prefer to provide means for damping or "braking" the recoil of the flexed springs from their positions of compression or expansion (e. g., C or R) to their position of static equilibrium (N). In the construction depicted in the first four figures of the drawings, these means comprise a wedge shaped block 39 which is slidably mounted in the slotted base of the block 35, and is pressed against the curved upper edge of a central tongue on the lever extension 38, by a spring 40. When the lever system 3—31—32 is rocked downward as a unit (on compressive movements) the block 39 is pushed backward into the widened opening between the base 35 and the tongue on the lever extension 38; and the recoil or return action of the compressed parts is "damped" or slowed down by the combined frictional and spring resistance of the elements 39 and 40 to the upward and forward thrust of the lever extension 38. The damping control means for the restraint of recoil movements from rebound position (R) comprises a hardened steel block or roll 41, that is mounted in the slotted end of the upper lever 32, and is pressed into the wedge shaped opening between this lever and the adjacent portion of the lever 30 by the concealed spring 42. When the two levers are separated by the expansion of the system—as shown in Fig. 2—the roller 41 is pushed to the left by the spring 42; and when the compressed spring 24 tends to recoil, the return movement of the lever-spring elements 24—30 to normal position is restrained and decelerated by the spring pressed frictional engagement of the elements 40—42 with the mutually inclined surfaces of the lever members 30—32.

The use of the frictional damping means last described results in a more graduated, and easier, return of the suspension elements from any position of excessive displacement to the normal position of static equilibrium; and thus reduces the "overthrow" or rebound of the parts beyond that normal position. This predamping action correspondingly reduces the duty imposed on the supplemental spring in resisting and checking the inertial oscillations of the system that are caused by a violent recoil of the elastic suspension members from an abnormally compressed condition; and may therefore add to the efficiency of the combination in quickly overcoming the effects of excessive and frequently repeated shocks. But, as already indicated, my improved supplemental-complemental-spring suspension system may be used either with or without the auxiliary friction control restraints which have just been considered.

The form of construction shown in Figs. 5 and 6 is designed for use in conjunction with a three-quarter-elliptic main spring, which consists of the semi-elliptic side leaf spring 2, bolted at its center to the axle block 5, and the scroll spring 2$^a$, bolted at its base to the body bracket 6. In the ordinary use of this form of suspension the adjacent eye ends of these two elastic elements are joined by a longitudinally rigid radius link, or shackle, that maintains the conjoined extremities at a fixed and invariable distance from each other; but in this second example of my improved organization the rigid shackle connection is replaced by a vertically flexible frame, which comprises; the solid link 7$^a$, that is pivotally supported at 11$^a$ on the body bracket 6; the cross links 14$^a$—14$^a$ that are pivoted to the eye bolt 17$^a$; the U-shaped radius link, 43, that is likewise pivoted, at 44, to the eye of the scroll spring 2$^a$; and the pintle bolt 20$^a$ that flexibly conjoins the inner ends of the three link members 7$^a$—14$^a$ and 43. It will be apparent that this linkage will permit the outer end of the main spring to move freely in a vertical plane, without imposing any substantial flexure on either of the elastic elements 2 or 2$^a$, until the upper side of the semi-elliptic element comes in contact with the lower end of the hanging link 7$^a$ (see dotted line position, C′, of Fig. 5); or until the eye of this same element engages with the head of the radius link 43 (see dotted line position, R, ibid); and that after such contact engagements occur both of the primary suspension members will be subjected to a portion of the displacement stresses imposed on the body and axle parts, and will be concurrently and proportionally flexed thereby, as the movement continues. But it will also be apparent that the linkage frame will prevent any lateral or sidewise movement of the cross connected ends of the main spring elements 2—2$^a$ with respect to the body frame; and will thereby check any tendency to side sway or cross rolling of the vehicle tonneau on its running gear supports.

The supplemental-complemental spring unit which cooperates with the interconnected main spring elements 2—2$^a$ comprises; a highly elastic multiple leaf spring 24$^a$, that is engaged at its outer eye-end with a cross slot in the hanger, 7$^a$, and is rigidly secured at its base to a lever element 30$^a$, which is, in turn, rotatably supported, by the cross bolt 31$^a$, on the end of a second lever 32$^a$. The latter member is pivotally connected, at its opposite extremity, to the slotted block 35$^a$, which is bolted to the body frame of the vehicle, and which is provided with side lugs, 45, that engage with the lower edges of the lever and prevent it from moving downwardly on its pivot connection 33$^a$. The inner end of the first lever 30$^a$ is also connected, by the links 36$^a$—36$^a$, with the axle bracket 5; and this lever is normally held in non-rotatable relation to its sister member 32$^a$ by a pressure contact engagement between the adjacent edge portions of the two levers. The upper lever 32$^a$ is preferably recessed on its lower side to receive two wedge shaped blocks 39$^a$ and 41$^a$, that are pressed apart by a spring 40$^a$, and are thus respectively held in frictional engagement with the central connecting rib of the lugs 45, and the upper curved edge of the lever arm 30$^a$. The base portion of the supplemental spring, 24$^a$, is also preferably connected to a pair of auxiliary coil springs, 46—46, which are mounted on opposite sides of the main leaf spring, 2, and are flexibly secured thereto by means of the clip 47.

The functional action of this organization is as follows: In the position of static equilibrium, N (shown in full lines in Fig. 5) the secondary springs 24$^a$—46 are under sufficient initial tension to carry all that part of the load that is ordinarily supported by the conjoined ends of the springs 2 and 2$^a$. When the system is subjected to an increased kinetic stress, or compressive shock, the thrust of the link connections, 36$^a$—36$^a$, lifts the interengaged lever system, as a unit, and imposes a progressively increased flexing strain on the secondary spring elements 24$^a$—46. As this action continues the free end of the main spring, 2, comes into engagement with the rigid link bar, 7$^a$, and receives therefrom a continually increasing proportion of the load or compression stress, which is then carried in parallel by both the primary and secondary suspension elements. The closing movement may continue until the lever system has been rocked through the angle, $n$—$c$, and the spring-lever-elements $24^a$—$30^a$—$32^a$ have thus been brought into engagement with the under side of the tonneau or body frame (as shown by the dotted lines $c$—$c$—$c$ of Fig. 5). In this phase of the action the lever $32^a$ moves away from the lug members 45—45; and the block $39^a$ is thrust into the widened opening thus formed by the spring $40^a$ (as shown in the detail view of Fig. 6). When the kinetic compression stress is relieved the flexed springs, 2—$2^a$, $24^a$—46, tend to recoil to their original static load position; and the violence or rapidity of this recoil movement is restrained and diminished by the frictional engagement of the spring pressed block $39^a$ with the surfaces on which it must slide outward as the lever system moves downward.

When the suspension system is subjected to a rebound or opening stress, that causes it to expand beyond the normal load position of the parts, the links $36^a$ act as tension elements and rotate the lever $30^a$ in a counter-clockwise direction on the pintle pin $31^a$; the second lever $32^a$ being held against reverse rotation by the stop lugs 45. The resultant upward movement of the lever-spring element $24^a$ imposes a rapidly increased flexure on both the secondary leaf spring and the auxiliary coil springs 46; the tension on the latter being augmented by the relative downward movement of the lower support 47. During this initial phase of this supplemental-spring suspension action the outer end of the main spring, 2, is free to move away from the body support without imposing any appreciable bending stress on its associate member $2^a$; but when the eye of this primary suspension member comes into engagement with the base of the U-shaped link 43 (position R), both of the main leaf spring elements 2—$2^a$ are subjected to reverse bending strains that cooperate in parallel with the positive tensions of the secondary springs to quickly check any undue or abnormal separation of the spring connected parts. When the lever $30^a$ has been moved through the angle, $n$—$r$, (Fig. 5) the intermediate portion of the supplemental leaf spring $24^a$ is brought into engagement with the lower side of the body frame, and the stiffness, and load carrying capacity, of that element is thereby greatly increased; so that any excessive rebound (beyond the position R—$r$, etc.) is thus effectively prevented, without imposing any dangerous strain on the elastic suspension members. The rapid recoil of the flexed springs—after the rebound movement is arrested—is damped and retarded by the frictional control action of the spring actuated block $41^a$, which is pressed outwardly into the wedge shaped opening between the stationary lever $32^a$ and the moving lever $30^a$.

The recoil check elements $39^a$—$40^a$—$41^a$ (like the corresponding parts of the first described construction) are not essential to the proper functional performance of my supplemental-complemental-spring combination; and may be omitted when it is desirable to obtain a very free undamped action of the suspension system. And if any of these parts—when used—should be accidentally lost, or if, through injury or wear, they should cease to perform their intended functions, the action of the other elements of the combination will not be injuriously affected, nor will the operation of the organization, as a whole, be interrupted or sensibly disturbed.

Figs. 7, 8 and 9 depict a form of supplemental-suspension-reinforcement mechanism which may be advantageously applied to a side leaf spring support for the front axle of an automobile or similar vehicle. These front axle springs are pivoted, at their outer ends, on rigid hanger arms that project forward from the tonneau frame; and are ordinarily connected, at their inner ends, to the body sills by means of swinging shackles. In the use of my invention these shackles are replaced by a vertically flexible, but laterally rigid, linkage, which is similar to the one shown more in detail in Figs. 1 and 3; and which comprises the H-shaped frame $7^b$, the forked end bar $14^b$, the stop extension $23^b$ thereon, and the pintle bolt connection $20^b$. This linkage, which is pivotally connected at its extremities with the body sill block, 48, and the adjacent eye of the main spring 2, respectively, permits of a certain range of free vertical movement between the connected parts; but it becomes longitudinally rigid, or vertically inflexible, when the link bar $14^b$—$23^b$ assumes either of the dotted line positions C' or R; and it then acts, as a solid shackle connection, to transmit a certain proportion of the load or rebound stress to the inner end of the primary suspension member.

The supplemental-suspension-reinforcement unit, which is interposed between the central or intermediate part of the main spring and the vehicle body, comprises, in this case, a pair of volute coil springs, $24^b$—$24^b$, arranged one on each side of the member 2, and supported thereon by the saddle frame $26^b$; and a single twin-arm lever $30^b$—$30^b$, which carries at its inner end the secondary spring caps $27^b$, and which is linked, at an intermediate point of its length, to the axle block, 5, by means of the bar $36^b$ and the clip block $37^b$. This lever is also provided with two cross-bolt fulcrum pins 31$^b$ and 33$^b$, which are engaged respectively in the arcuate slots of the arms 49 and 50, that form a part of the body frame block 35$^b$. The cross bolt 31$^b$ is also engaged with the head of a hollow plunger 51, which slides vertically in a cylinder, 52, that is clamped to the axle block 5. This plunger is provided, at its bottom, with a valve, 53, which opens downwardly; and its interior is filled with a heavy viscous oil or grease similar in character to that which is used in the transmission and differential gear chambers of an automobile.

The operation of this third illustrative embodiment of my invention is essentially the same, in principle, as that which characterizes the two previously described constructions. In the normal load position of the parts, the inner ends of the lever arms 30$^b$, and the spring caps 27$^b$ carried thereby, are in engagement with the body frame 6; and the supplemental springs 24$^b$ are under sufficient initial tension to balance all that portion of the load that is ordinarily supported on the inner eye end of the main leaf spring 2. This normal load tension is transmitted to the saddle support 26$^b$; and in this case the rear horn of the saddle is so close to the free end of the main spring 2 that a portion of the said load will be effective in producing an initial flexure of the said end; the amount of such flexure being dependent upon the form of the front horn, and its manner of attachment to the more rigid intermediate part of the primary suspension member. When the system is subjected to an increased load stress or compressive shock, the upward thrust of the link bar 36$^b$ rocks the lever on the fulcrum pin 33$^b$ and thus imposes a progressively increased tension on the supplemental suspension coils 24$^b$—24$^b$; and as this movement continues, the inner end of the main spring, 2, is also indirectly subjected to an augmented bending strain by reason of the greater pressure exerted on the saddle connection 26$^b$. But these two spring elements still continue to act in series—i. e., the supplemental coil springs act as an elastic suspension for the adjacent part of the primary leaf spring—until the vertically flexible linkage 7$^b$—14$^b$, has reached its compression limit (position C′). As soon as this occurs the load stress on the body bracket 48 will be transmitted directly to the adjacent end of the main spring 2; and the primary and secondary suspension units will then act in parallel, to reinforce each other, against further compression of the system.

The angular movement of the lever 30$^b$ on the fulcrum pin 33$^b$, lifts the outer end of the lever and its associated fulcrum pin 31$^b$, and thus raises the plunger 51 in the cylinder 52. As the plunger rises, the valve 53 opens and allows the oil above it to fill the bottom of the cylinder below the plunger. When the compression of the system is arrested, by the progressive flexing of the supplemental and main spring elements, the rapid recoil of the compressed suspension units is retarded and damped by the "dash pot" action of the oil which is "trapped" below the plunger 51, and which can only escape to the interior thereof through the small bearing clearance around the central guide stem of the valve 53. This liquid "damping" of the recoil or reaction movements may be increased or diminished as required, either by varying the size of the bearing "vent" between the plunger and cylinder chambers, or by varying the viscosity of the liquid, or by omitting the latter entirely, and relying only on the compression of trapped air to effect the desired result.

When the suspension system is returned to the condition of static equilibrium and is carried beyond the point of balance—either by the effect of kinetic inertia or by an expansion stress—the increased separation of the body and axle members imposes a pull on the link connection 36$^b$; and this rocks the lever 30$^b$ on its fulcrum pin 31$^b$, which is now supported on the bottom of the slot guides in the bracket arms 49—49 (see Figs. 7 and 8). This angular movement of the lever on the fulcrum support 31$^b$ is relatively much more rapid than its angular movement on the support 33$^b$; and the resultant compression of the supplemental coils, 24$^b$—24$^b$, is correspondingly much greater for a given linear separation or expansion of the body and axle members, than it is for the same linear movement of approach. In consequence of this the usual rebound movements of the system are very quickly and effectively checked by the supplemental-series-suspension action of the secondary springs alone; but in the case of an excessive or abnormal expansion of the parts the guide linkage 7$^b$—14$^b$, etc., will be brought to its rebound limit (position R) and will then act as a solid or longitudinally rigid shackle to positively couple the body to the inner end of the main spring, and thus bring the latter into parallel reinforcement-relation with the secondary suspension unit. And when the separation of the body and axle members has rocked the lever 30$^b$ through the angle, $n$—$r$, the bolt 33$^b$ will engage with the bottom of the guide slots of the bracket 50, and will thus positively and concurrently arrest any further expansion of the system and any further flexure of its elastic suspension elements.

During the last described action the opposite movements of the plunger 51—which is held in fixed relation to the body supported fulcrum pin 31$^b$—and of the axle supported cylinder 52, will again admit a quantity of oil to the lower end of the cylinder; and on the reverse or return movement of the parts this oil will be trapped below the plunger, and will act, as before, to restrain and damp the recoil of the flexed springs to their normal load positions; and will thus eliminate the effects of a violent and uncontrolled reaction of these resilient elements from an abnormally strained position.

The damping control unit—comprising the parts 51—52—53, etc.—may be omitted, without changing the essential character of the series-parallel (or suspension-reinforcement) action which characterizes my improved organization; and any accidental loss or injury of the said control elements will not interfere with the proper operation of the other parts of the organization.

In the structure illustrated in Figs. 10 to 13 inclusive, the outer end of the main side leaf spring 2 is provided with an eye bolt 17ᶜ which carries two hardened steel rollers 55—55; and the usual shackle coupling that connects this main spring end with the body member 6 is replaced by a two-part guide bracket that is secured rigidly to the said member by the bolts 11ᶜ—56—57 and 58. The outer part of this bracket consists of a recessed cap, 59, which receives and guides the eye bolt rollers 55—55 (see Fig. 12); and the other part consists of a longer U-shaped channel member, 60, which is provided at its inner end with a fulcrum roller 33ᶜ, and which is widened at its other extremity to fit over the edges of the cap part 59; the two parts being clamped together both by the bolts 11ᶜ—56—57 and also by the bolt 61. The front edges of the vertical portion of the member 60 are turned inwardly and connected together at the bottom by the flange 62, to form laterally rigid guides for the edges of the main spring 2 (as best shown in Fig. 12). The assembled parts therefore constitute an effective double guide connection between the body and the outer extremity of the main spring, which will prevent any relative sidewise play of these two parts, but which will permit of a certain range of free vertical movement thereof; the extent of said movement being limited in one direction by the engagement of the rollers 55 with the bottom of the recess in the cap 59 (dotted line position R, of Fig. 10 and full line position of Fig. 11), and limited in the other direction by the means described later.

The supplemental spring element of the construction now under consideration consists of a relatively flexible multiple leaf spring 24ᶜ, the base of which is rigidly secured to the stiff central portion of the main spring 2, by means of the clip, 26ᶜ, and the end of which is slidably engaged with the outer extremity of the curved lever member 30ᶜ. This lever is mounted, at an intermediate point in its length, on the cross bolt 31ᶜ that may be conveniently carried by the clip 26ᶜ, and is flexibly connected at its inner end to the vehicle body by means of the strap 36ᶜ and the adjustable block 37ᶜ. The outer end of the lever is pivotally coupled by the pin 63 to a U-shaped head 27ᶜ, which slides longitudinally in the grooves 64—64, formed between the sides and flanged edges of the assembled bracket members 59—60 (as best shown in Fig. 12), and which is provided with projecting ears, 65, that are adapted to engage the rollers 55—55 of the main spring eye bolt 17ᶜ. The head 27ᶜ is also preferably provided with friction plates 66—66, which are loosely carried on the ends of the pin 63; and which are engaged, on their outer faces with the sides and edges of the grooves 64—64, and, on their inner faces, by the beveled edge portions of the head 27ᶜ (as best shown in Fig. 13).

The functional performance of the last described organization is also substantially the same as that which characterizes the constructions shown in Figs. 1 to 9 inclusive; and will require, therefore, only a very brief explanation. When the organization is subjected to compressive shock, the relative approach movement of the body supported fulcrum roller 33ᶜ and of the axle supported main spring clip 26ᶜ, will rock the lever 30ᶜ in a clockwise direction—from the position, N—N, shown in full lines toward the position C—C—c shown in dotted lines in Fig. 10—thus producing a progressively increased flexure in the initially tensioned supplemental-suspension spring 24ᶜ. During the first part of this movement— represented, for example, by the linear displacement N—C' (Fig. 10)—the outer end of the main spring 2 is free from load; but the relative downward motion of the lever actuated head 27ᶜ soon brings the ears 65 into contact with the rollers 55; and after this occurs the compression stress is not only carried in parallel by the mutually complementary suspension elements, but the subsequent continued flexure of those elements is substantially equal in amount. When the system is subjected to an expansion stress—which separates the body and axle parts beyond the normal load position of Fig. 10—the lever 30ᶜ is again rocked in a clockwise direction on its pivot support 31ᶜ by the pull of the flexible strap 36ᶜ; and the supplemental spring is again increasingly flexed as shown in Fig. 11. The pivot supports and connections of the lever 30ᶜ, are so arranged that the angular deflection of the lever-spring elements is much greater for a given linear separation of the body and axle parts than it is for the same compression or approach movement thereof; and the elastic checking of the rebound action is correspondingly accelerated. And when the expansion or opening movement is excessive the head elements 65 will again be brought into contact with the eye bolt rollers 55, and will force the main spring down—in parallel with the supplemental spring—until the concurrent positive flexure of both is arrested by the contact of the rollers with the bottom of the recess in which they move (see full line position, R, Fig. 11). During any downward movement of the lever head 27$^c$, the friction plates 66—66 are relieved of pressure; but in any return upward movement—from either a compression or an expansion displacement—the said plates are forced outwardly, by the coaction of the beveled portions on the plates and the head, and are pressed tightly against the faces of the guide grooves 64—64. The frictional resistance thus interposed to the recoil of the flexed suspension members "damps" and restrains any violent reaction movement from a position of extreme displacement, and thereby aids in preventing, or in very quickly extinguishing, any continued inertial oscillations of the spring connected parts. But this damping means may be omitted, as in previous cases, without changing the nature and generic character of the structure on which it is used.

Figs. 14 and 15 diagrammatically depict another application of my improvements to a front axle support. In the structure here shown the inner end of the main side leaf spring 2 is coupled to the central portion of the body frame by means of a vertically flexible, but laterally rigid guide connection, which comprises, a V-shaped linkage frame similar to the ones shown in Figs. 1–3 and 7, and a broad elastic strap or band 67, that is clamped to the body block 48$^d$, and is flexibly connected, at its other end, to the lower element 14$^d$ of the linkage guide frame. The upper link 7$^d$ of this frame is provided with a hardened steel roller 68, that supports the end of the supplemental leaf spring 24$^d$; and the stiff base portion of this spring is bolted rigidly to a lever frame 30$^d$, which is pivotally supported, at an intermediate point in its length, on the cross bolt 33$^d$ of the U-shaped body block 35$^d$. The forward extremity of this lever frame carries a roller 31$^d$, which is adapted to engage with the upper side of the front axle block, 5; and the opposite extremity of the said frame is connected to the relatively stiff central portion of the main spring 2, by means of the folding or collapsible link coupling, 36$^d$, and the clip 37$^d$. The lever member is also preferably provided with a "one way" friction check mechanism which comprises two pair of co-operating disc elements, 66$^d$—69 and 66$^d$—69, that are mounted to revolve freely on the shouldered ends of the cross bolt, 33$^d$, and a plate 70 which is non-rotatably connected to the hub of the lever (see Fig. 15). The contiguous faces of the friction discs 66$^d$—69 are maintained in constant pressure engagement with the opposing faces of the connected lever and plate members, 30$^d$—70, by means of three springs 71—71—71; and the exterior peripheries of the outer flanged discs 66$^d$—66$^d$ are engaged by a cross roller pawl 72 (shown in section in Fig. 14 and in dotted lines in Fig. 15) which is held in operative engagement therewith by the light springs 73. The operation of this mechanism is as follows: When the body and axle parts are forced toward each other (toward the dotted line position C′—C—c) the lever frame, 30$^d$, is rocked in a counterclockwise direction, by the pressure engagement of the roller 31$^d$ with the axle block, 5—(the collapsible link connection 36$^d$ being folded up into the dotted line position, C, c)—and the initial load tension of the supplemental-suspension spring 24$^c$ is progressively augmented to resist and check the kinetic compression of the system. Conversely, when the parts expand beyond the normal load position of Fig. 14, the pull of the tension links 36$^d$ again rocks the lever 30$^d$ in the same direction as before—but at a greatly accelerated ratio of angular-linear displacement of the engaged elements—and the positive flexure of the secondary leaf spring is rapidly increased to quickly arrest the rebound action of the organization. Both the compression and the expansion movements are, at first, resisted almost entirely by the elastic flexure of the suspension unit, 24$^d$;—the inner end of the main spring 2 being free to move through the range N—C′—N—R—N, without being subjected to any strain, other than that transmitted to it, in series, through the roller 68 and the linkage 7$^d$—14$^d$, supplemented by the relatively slight flexural strain in the elastic guide element 67. But, as these displacements increase in amplitude, the arms of the guide linkage are locked against further free vertical movement, by the contact of the arm 14$^d$ with the roller 68, or by the engagement of the stop 23$^d$ with the link 7$^d$; and after this occurs the main spring acts in parallel with the supplemental spring 24$^d$; and the two resilient suspension members mutually reinforce each other to restrain and absorb the effects of the more severe stresses and shocks of service. Any movement away from normal load position carries the roller pawl 72 out of pressure engagement with the flanged discs 66$^d$, 66$^d$, and permits the entire disc system to rotate as a unit with the lever head; but when the reactive or return movement begins, the member 72 is wedged into the triangular openings between the said flanges and the base of the block 35$^d$; and the discs 66$^d$ are held stationary with respect to the other rotating members of the friction check mechanism, thus interposing a damping restraint or check on the recoil of the resilient suspension elements.

Figs. 16—17 and 18, illustrate another embodiment of my improvements, which resemble, in some details, the construction shown in Figs. 1 to 6, and in other details the structure depicted in Figs. 14 and 15. In this sixth illustrative exemplification, the outer end of the main side leaf spring 2 is operatively coupled to the body hanger 6 by means of the vertically flexible, but laterally rigid, spring-link elements $7^e$—$14^e$, which are pivotally connected to the cross bolts $11^e$ and $17^e$ respectively, and which are limited in their range of closing movement by the contact engagement of rollers or washers on the ends of the hanger bolt, $11^e$, with the upper face of the link bar $14^e$ (see upper dotted line position C' of Fig. 16). The latter member is also provided with an inwardly projecting flange or cross head to which the end of the supplemental leaf spring $24^e$ is rigidly riveted; and the base of this spring is bolted to a lever member $30^e$, that is shackled to the body bracket $35^e$ by the swinging links 75—75 and the cross bolts $33^e$ and 76. The inner end of this lever member carries a roller $31^e$, that is adapted to make contact engagement with the flattened top of the axle bracket 5; and the forward portion of the said member is coupled to the stiff central part of the main spring, 2, by the flexible strap, $36^e$, and the clip $37^e$. The lever $30^e$ is provided with a curved rib or tongue $38^e$ that is adapted to make contact with the body frame and thus limit its counterclockwise rotation on the shackle bolt $33^e$. This curved rib may also be utilized as one element of a friction check mechanism which comprises a dovetailed slot in the base of the body bracket, $35^e$, and a wedge shaped block $39^e$ that is fitted closely therein, and is kept in pressure engagement with the said rib by the concealed spring $40^e$. When this assemblage of parts is subjected to compressive stresses, the relatively opposed movements of the axle and body blocks 5 and $35^e$ rock the lever $30^e$ in a clockwise direction on its shackle link supports; and this increases the initial suspension tension of the supplemental leaf spring $24^e$. In this case the flexural strain in the supplemental spring is transmitted directly to the outer end of the main spring through the link connection $14^e$; and the two elastic suspension elements act in series, until the continued approach of the main spring and body parts brings the link frame $14^e$ into rocking engagement with the end elements of the body bolt $11^e$, and thereby puts the primary and secondary springs into parallel or reinforcement relation to each other.

When this organization is subjected to a rebound or expansion stress the separation of the body and main spring members imposes a tension on the flexible strap $36^e$, which is connected to the lever $30^e$ at a point relatively close to the pivot bolt support $33^e$; and this produces a correspondingly accelerated flexural movement of the lever-actuated-supplemental spring, that is again transmitted in series to the outer eye-end of the main spring, and produces a concurrent positive bending thereof. During these angular movements, of the lever $30^e$, in a clockwise direction, the curved rib $38^e$ moves downward, away from the bracket $35^e$, and the block $39^e$ is forced backward by the spring $40^e$, toward the position shown in Fig. 17. When the parts react, or return toward the normal load position, the counterclockwise rotation of the lever is retarded by the frictional resistance of the block $39^e$ to forward movement; and the quick or free recoil of the flexed springs is thereby effectively restrained and damped.

In the organization shown in Figs. 19 to 22 inclusive the linkage which connects the outer end of the main spring 2 with the body scroll iron 6, comprises the H-shaped outer link, $7^f$, and the forked, or U-shaped, inner link $14^f$, flexibly connected by the pintle or hinge bolt $20^f$; and the linkage permits of the relative up and down movement of the connected members from the full line position of Fig. 19 to the dotted line position C' of the same figure, or to the full line position of Fig. 20, without allowing the relatively moving parts to swing or sway out of proper vertical alignment. The link frame $7^f$ is also provided with a supplemental cross pin $68^f$ that passes through the eye of the secondary leaf spring $24^f$; and the base of this spring is bolted to the outer end of a lever member $30^f$ that is connected, at its inner end, to the axle block 5, by the link bar $36^f$ and the clip $37^f$. The lever $30^f$ is suspended between the two side arms $32^f$—$32^f$, of a second lever frame, by means of the swinging links $75^f$—$75^f$; and this second lever frame is, in turn, rigidly mounted on the cross bolt $33^f$ that is rotatably supported in the forked body bracket $35^f$. The outer extremities of the arms $32^f$ are reinforced by the inwardly turned ribs 77 that closely embrace the edges of the leaf spring $24^f$; and are also rigidly connected by the cross bolt 78, which bears, at its center, on the upper face of the said spring, and which carries, at its ends, the two recessed caps $27^f$—$27^f$, that engage with the upper coils of the volute springs 79—79. This auxiliary pair of coil spring elements is supported on the stiff central portion of the main spring 2, by means of the T-shaped head $26^f$. The inner extremities of the lever arms $32^f$ are enlarged to form the outer plates of a "one way" rotary friction check mechanism; and the other elements of this mechanism comprise the fibre discs 69ᶠ—69ᶠ, the flanged metal disc 70ᶠ, the drum 80, which is rotatably mounted on the central portion of the cross bolt 33ᶠ, and the springs 71ᶠ, 71ᶠ, etc., which serve to maintain the various friction disc surfaces in constant pressure engagement. The flanged peripheries of the disc member, 70ᶠ, and of the drum, 80, are notched to form ratchet teeth; and the drum 80 carries a rotatable collar 81 which is provided with a cross pin 82 and a pair of pawls 83—83, that engage with the said teeth. A second set of pawls 84—84, are mounted on the cross pin 85 of the bracket 35ᶠ, in such position as to also engage these ratchet teeth and prevent any counterclockwise rotation of the members 70ᶠ and 80. The collar 81 is grooved to receive a flexible band 86, that is secured, at one end to the rotatable member, and at the other to the axle block clip 37ᶠ; and a pair of spiral springs 87—87 are attached, at their outer extremities to the ends of the pin 82, and at their opposite extremities to the side forks of the bracket 35ᶠ.

From a structural point of view, the organization last described differs from those previously considered in having two lever actuated supplemental spring units, 24ᶠ and 79, that are separately attached to the lever elements 30ᶠ and 32ᶠ. This change does not, however, affect the general operative character of the combination. When the parts are in the position of static equilibrium, the outer end of the lever frame 32ᶠ is in engagement with the body frame (full line position of Fig. 19); and the supplemental-suspension-springs 24ᶠ and 79—79 are then under sufficient initial tension to relieve the outer end of the main spring 2 from all normal load stress. When the system is subjected to an added kinetic load, or compression stress, the lever frame 32ᶠ remains stationary; but the other lever 30ᶠ, and the leaf spring 24ᶠ attached thereto, are rocked in a clockwise direction on the shackle link suspension 75ᶠ—75ᶠ, by the upward thrust of the link 36ᶠ. This produces an increased tension in the secondary spring 24ᶠ, which is transmitted, through the pin support 68ᶠ, and the vertical link 7ᶠ, to the body hanger 6. The approach of the body and main spring members—and of the spring heads 27ᶠ—27ᶠ and 26ᶠ—also produces a corresponding linear compression of the coils 79—79, that cooperates with the magnified flexural action of the lever-spring elements, 30ᶠ—24ᶠ, in resisting and restraining the closing movements of the said members. In this first stage of the compressive action, the outer end of the main spring, 2, is free to move vertically with respect to the body; but when the guide link 14ᶠ has rocked upwardly to the dotted line position C' (Fig. 19), this free movement is arrested by the engagement of the said link with the supplemental-spring-connection, 68ᶠ, on the other linkage guide element 7ᶠ. The locked linkage arms 7ᶠ—14ᶠ then act, as a rigid shackle, to couple the adjacent main spring and body parts to each other; and after this occurs the primary suspension element is brought into parallel flexural operation with the secondary suspension elements; and all of these elements act, as mutually complementary reinforcement units, to rapidly check any unusual or excessive compression of the system.

During the closing movement of the body and axle parts the depending portion of the strap, 86, is shortened, and the collar 81 is rotated to the left—by the expansion of the spiral springs 87—without moving the friction disc elements. But when the reverse movement begins the pawls 83 engage with the toothed peripheries of the disc members, 70ᶠ and 80, and the right handed rotation of the collar 81—which is necessitated by the separation of the body and axle members—is now resisted by the frictional engagement of the mutually rotating parts 70ᶠ—80, with the relatively fixed heads of the lever frame 32ᶠ, and the interposed fibre discs 69ᶠ. This frictional resistance damps the elastic recoil of the flexed springs, and thus prevents any violent "overthrow" or inertial rebound of the parts past the initial loci of static equilibrium. But when the body and axle members are separated beyond this normal load position, by any unusual rebound or expansion stress, the downward pull of the link 36ᶠ rocks both levers, 30ᶠ—32ᶠ, as a unit, on the trunnion supports of the cross bolt 33ᶠ—(the independent counterclockwise motion of the lever 30ᶠ being now prevented by the stop action of the cross bolt 78)—and thus concurrently subjects the spring 24ᶠ and 79—79 to a magnified and progressively increased flexure, that will energetically restrain and promptly check such opening movements. This series-suspension restraint of the expansion of the system does not, at first, affect the free downward swing of the link 14ᶠ, and its main spring connection; but when the said link reaches the position R, shown in Fig. 20, it comes into contact engagement with the cross bar of its companion element 7ᶠ; and the two locked elements then serve to shackle the primary suspension member to the end of the body hanger 6, and to thereby bring the said member into parallel or reinforcement relation to the secondary suspension springs 24ᶠ and 79—79.

During the clockwise rotation of the lever frame 32ᶠ, all of the parts of the friction check mechanism, 69ᶠ to 86 inclusive, move concurrently therewith; and do not therefore interpose any resistance to the elastic restraint of the expansion movement. But when the movement is arrested the flexed resilient elements of the suspension system tend to quickly recoil—this tendency being aggravated at times by the action of gravity on the body member—and this tendency is controlled and checked by the action of the pawls 84—84 that prevent any left hand rotation of the friction check members 70$^f$ and 80, and thereby hold them stationary against the frictional thrust of the backwardly moving lever head and associated disc elements 69$^f$.

The construction shown in Fig. 23, is one in which two separately supported and separately actuated leaf springs 24$^g$ and 79$^g$ are employed as the supplemental-suspension-reinforcement unit. The outer eye ends of these springs are pivoted respectively to the lower and upper bars, 14$^g$ and 7$^g$, of the vertically flexible, but laterally rigid, guide linkage which serves to operatively connect the extremity of the main spring 2 with the body hanger 6; and the inner base portions of the said springs are bolted to the associated lever members 30$^g$ and 32$^g$. The lower lever member 30$^g$ is suspended from the central and relatively rigid part of the main spring, by means of the swinging shackle links 88 and the clip bracket 37$^g$; and is provided at its inner end with a fulcrum roller 31$^g$ that is adapted to engage with the body bracket 35$^g$. The upper lever 32' is suspended from this same bracket by the shackle links 75$^g$; and is pivotally connected, at an intermediate point in its length, to the upper end of the links 36$^g$. The lower ends of this last mentioned pair of links are rigidly conjoined by a cross bolt 63$^g$, which carries a slotted block 39$^g$ that is adapted to closely engage the lower curved edge of the first lever 30$^g$. A pair of tension springs 40$^g$ are connected, at one end to the body bracket 35$^g$, and at the other end to the intermediate parts of the links 36$^g$, and serve to pull the latter to the left when the body and axle members are pressed toward each other. This phase of the movement rocks the lower lever, 30$^g$, on its fulcrum roller support 31$^g$, and thus permits the block 39$^g$ to slide inwardly, along the curved edge on which it bears, without affecting the position of the upper lever 32$^g$. The counterclockwise rotation of the lower lever also progressively increases the initial suspension strain on the compression resisting supplemental spring 24$^g$, and a small part of this strain is transmitted, through the guide link member 14$^g$, to the outer free end of the main spring. The two springs 24$^g$ and 2, are thus connected in series and continue to act in that relation, until the closing movement of the system brings the supplemental spring eye connection with the link bar 14$^g$ against the main spring 2 (see dotted line position C'). After this occurs the load stress on the rear end of the body may be transmitted directly, from the hanger bolt 11$^g$ and upper link 7$^g$, to the adjacent part of the primary suspension member; and the primary and secondary springs 2 and 24$^g$ act in parallel to mutually reinforce each other against further compressive flexure. When the return movement begins, the normally rapid recoil of the strongly flexed leaf springs is restrained by the combined frictional and spring resistance to the right hand movement of the links 36$^g$ and the block 39$^g$, and the consequent frictional "drag" on the downwardly moving lever arm 30$^g$. When the parts have been restored to normal load position the central portion of the spring 24$^g$ is in contact with the adjacent portion of the main spring, and is thus maintained under the initial tension required to carry the static load. When the body and axle members are further separated—by a rebound or expansion stress—the lower supplemental suspension spring is still held in substantially fixed relationship with the main spring; and the concurrent movement of these suspension members, away from the other secondary spring 79$^g$, imposes a continuing pull on the links 36$^g$—36$^g$. These links are now held in approximate alignment with the suspension links 88—88; and, as a consequence of this, the longitudinal stress on the connections, 36$^g$—88, is principally effective in producing a largely magnified angular movement of the upper supplemental lever-spring members 32$^g$—79$^g$, and a correspondingly increased flexural resistance—in the upper spring—to the expansion of the system. The strain in the spring 79$^g$ is transmitted to the upper guide link 7$^g$, through the cross bolt connection 68$^g$; and this serves to accelerate the free opening movement of the linkage frame until the cross bar of the upper link comes into engagement with the extensions 23$^g$ of the lower link 14$^g$. After this occurs the primary and secondary springs 2 and 79$^g$ act in parallel to restrain further separation of the body and axle parts. In this case the quick recoil of the supplemental rebound check spring 79$^g$, is frictionally damped by longitudinally corrugating the individual leaves—so as to increase their area of sliding contact—and providing an elastic compression clip at the terminus of each leaf—as shown in Fig. 23—to increase the frictional pressure engagement of the sliding surfaces.

Figs. 24 and 25 illustrate another embodiment of my invention in which two separately actuated counteracting spring units are employed to respectively resist compression and expansion movements. The first of these units comprises a pair of helical coil springs, 24$^h$—24$^h$, arranged one on each side of the main spring 2, and connected, at one end to the main spring clip 26$^h$, and at the other end, to the inner extremities of a double arm lever 30$^h$—30$^h$, which is pivotally supported, at 33$^h$, on the body bracket 35$^h$. The second unit consists of a multiple leaf spring 79$^h$ that is pivotally coupled, at its eye end, to the H-shaped link bar, 14$^h$, and is bolted, at its base, to a lever 32$^h$, which is also suspended from the bracket 35$^h$ by the swinging links 75$^h$. The second lever is suspended between the arms of the first lever; and the intermediate parts of both of these spring actuating members are operatively connected to the axle bracket, 5, by means of the long cross bolt 90, the links 36$^h$—36$^h$ and the axle clip 37$^h$. The base of the leaf spring 79$^h$ is provided with beveled notches which receive the wedge shaped blocks 66$^h$—66$^h$ that are adapted to frictionally engage the adjacent faces of the lever arms 30$^h$—30$^h$; and in order to more effectually resist the outward thrust of these blocks the said arms are rigidly bound together, at their opposed edges, by the spacer block and bolt members 91—92. In this construction the vertically flexible, but laterally rigid guide linkage connection, between the inner end of the front side leaf spring 2 and the body bracket 48$^h$, is of quadrangular form; and comprises the two main links 7$^h$ and 14$^h$ (the latter of which supports the eye end of the secondary leaf spring 79$^h$), and the two auxiliary links 7$^{hh}$ and 14$^{hh}$. The free vertical range of movement of this link frame is limited, in one direction by the engagement between the upper member 7$^h$ and the cross bar of lower member 14$^h$, and in the other direction by the engagement of this same cross bar with the auxiliary member 14$^{hh}$.

The functional action of the various elements of the last described organization will be readily understood, without extended explanation. When the parts are in the normal load position, the spacer lock 91 rests on the shackle supported end of the lever 32$^h$; and the central portion of the associated leaf spring 79$^h$ is in pressure engagement with a block, 93, of resilient or semi-resilient material, which is mounted on the body frame. The counteracting secondary springs 24$^h$ and 79$^h$ are thus maintained under such respective initial tensions as are necessary to support that part of the load ordinarily carried by the inner end of the front side leaf spring 2. When the load stress is increased, the resultant approach of the body and axle members lifts the lever arms 30$^h$—by the engagement of the cross bolt 90 with the upper ends of the slots in the said arms—without disturbing the position of the lever 32$^h$. This imposes a rapidly increased tension on the helical coil springs 24$^h$—24$^h$; and also imposes a lesser increase of bending strain on the outer position of the leaf spring 79$^h$; and the flexural strains in both springs are at first transmitted in series to the adjacent portion of the main spring 2. But as this approach movement continues the link arms 7$^h$ and 14$^h$ engage each other, and this converts the vertically flexible guide linkage into a vertically inflexible shackle connection that directly transmits a portion of the load stress to the eye end of the primary suspension member. When this occurs further direct flexure of the secondary leaf spring 79$^h$ is arrested; but the continued closing movement of the parts is energetically resisted and quickly checked by the combined action of the main spring 2 and the supplemental coil springs 24$^h$—24$^h$ which now act in parallel, to reinforce each other against excessive compression.

When the parts have returned to normal load position—(as shown in full lines in Fig. 24)—and are subjected to a rebound or expansion stress, the cross bolt 90 engages with the upper notched edge of the lever 32$^h$, rocks the said member downwardly on its shackle suspension 75$^h$, and thereby imposes a greatly augmented bending strain on the upper supplemental leaf spring 79$^h$. This movement does not affect the position of the lever 30$^h$ which remains at rest on the shackle supported end of the lower lever; but the linear separation of the body and of the axle supported main spring imposes an equal linear extension on the coil springs 24$^h$—24$^h$. The increased flexural strains on both the upper and the lower supplemental springs are transmitted to the main spring through the link connection 14$^h$ and the clip connection 26$^h$; and these springs therefore act, as series suspension elements, until such time as they are brought into parallel operative relation to the spring 2 by the locking of the opening linkage frame (as before explained) and the consequent shackling of the primary suspension member to the body bracket 48$^h$. Any excessive expansion movement is therefore resisted—like any excessive compression movement—by a parallel, or reinforcement, action of the main and supplemental spring elements; and an abnormal "overthrow" or rebound of the resiliently supported parts is thus effectively and quickly arrested.

The positive, or forward, angular movements of the levers 30$^h$ and 32$^h$—i. e., the upward swing of the lever 30$^h$ or the downward swing of the lever 32$^h$—are not accompanied by any frictional damping action; but when the return movement begins the wedge shaped blocks 66$^h$ are forced outwardly (by their engagement with the beveled notches in the sides of the spring 79$^h$); and the recoil of the flexed springs, from either position of displacement, is retarded and "eased down" by the frictional engagement between those blocks and the contiguous faces of the arms 32ʰ. This relatively simple arrangement of parts is therefore effective in damping the reactive movements of the system either from the position of compression (dotted line position C—c, etc.) or from the position of rebound (dotted line position R—r); but the general operative character of the organization will not be changed, nor will its action be prevented or disturbed, by the removal or accidental loss of the friction check elements.

Figs. 26 to 29 inclusive show a very simple form of counteracting-supplemental-spring construction which is adapted to utilize my invention in conjunction with the side leaf spring suspension of a truck axle. In this exemplification of my improvements the usual rigid shackle support for the outer end of the main spring 2, is replaced by a longitudinally grooved guide frame, that comprises the two side bars 95 that are rigidly secured together by the shouldered cross bolt 11¹ and the spacer block and bolt connection 61¹. The grooved sides of the bars, 95, are adapted to closely engage and guide the edges of the main spring eye and the shouldered pin 17¹ which is secured therein; and the range of free vertical movement of these main spring parts is limited and determined by the lengths of the guide grooves. The supplemental-complemental-suspension-reinforcement unit, which cooperates with this vertically flexible, but transversely or laterally rigid guide connection, comprises the following elements, to-wit: A single volute coil compression spring 24¹ interposed between a main spring support 26¹ and the head 27¹; a pair of helical coil expansion springs 79¹—79¹, positioned one on each side of the main spring and connected thereto by the clip bracket 37¹; and a lever member 30¹ that is rotatably mounted on the cross bolt 33¹ of the body bracket 35¹, and is suitably connected, at its opposite end, to the spring head 27¹, and to the cross bar support 68¹, of the coil springs 79¹—79¹. The central part of the cross bar 68¹, is coupled to a vertical link rod 36¹, which slides longitudinally in the tubular guide extension, 96, of the bracket 37¹, and which is normally in pressure engagement, at its lower end, with the upper face of the main spring 2. The head 27¹ is also provided with a tubular extension 97 which is slidably engaged by the head of a bolt 98 that is screwed into the main spring clip block 26¹. The outer and shorter arm of the lever 30⁰ is normally in engagement with the lower side of the body block 35¹ (as shown in Fig. 26); and it is preferably provided with a rocking friction drum 39¹, which is mounted on the cross bolt 99, and which is held in frictional engagement with the curved recessed face of the body block 35¹ by the concealed spring 40¹.

In the normal static load position of the parts all of the coil springs, 24¹, 79¹—79¹, are maintained under a predetermined initial flexure—the first by the tension engagement between the tubular member 97 and the bolt 98 which limits the separation of the heads 26¹ and 27¹, and the second by the pressure engagement between the rod 36¹ and the main spring 2 which correspondingly limits the approach of the tension spring supports 37¹ and 68¹—and the initial compression of the spring 24¹ is sufficient to elastically support all that part of the static load that would ordinarily be carried by the outer end of the main spring 2. When the load stress is augmented by a kinetically imposed shock the main spring and axle parts are forced upwardly; the head 26¹, the link rod 36¹ and the inner end of the lever 30¹, are all concurrently lifted—in unison with the main spring—while the outer extremity of the lever, together with the head 27¹ are correspondingly depressed, and the volute coil member 24¹ is thereby subjected to a magnified linear compression that acts, in series with the main spring, to effectively restrain and cushion the effect of minor shocks and jars. If the applied stress is sufficiently great to force the main spring eye bolt 17¹ into engagement with the upper ends of the grooved side bars 95—95—and thus permit of a direct transmission of the load from the body hanger 6 to the primary suspension member—the two resilient support elements 2 and 24¹ will then act in parallel, and their mutually reinforced elastic resistance to further flexure will quickly check and absorb excessive vibration and abnormal compression shocks. When there is a reverse expansion movement of the system, the separation of the body and main spring brackets 35¹ and 26¹, and the tensioned connection, 97—98, between the bracket 26¹ and the lever supported head 27¹, cooperate to rock the lever in a clockwise direction, on its pivot bolt 33¹, and thus lift the inner end thereof away from the main spring. The opposed displacements of the tension spring supports, 68¹ and 37¹, impose a greatly magnified flexure on the coils 79¹—79¹ (as indicated by the dotted lines R—R—r, etc. of Fig. 26); and this is sufficient to arrest any ordinary rebound movement without assistance from the main spring. But when the expansion of the system is unusually great, the main spring eye bolt 17¹ will be carried to its lower limit of free movement in the guide frame 95—95; and the springs 2 and 79¹—79¹ will then be coupled in parallel to resist such excessive separation of the parts from normal load position.

Any clockwise rotation of the lever 30¹—by either the compression or the expansion of the system—carries the friction drum support, 99, away from its body block bearing, and the drum $39^l$ is pushed forward into the widened opening between these parts by the expansion of the spring $40^l$ (as best shown in Fig. 27). When the return movement begins the normally quick recoil of the resilient suspension elements is retarded and damped by the frictional resistance between the pressure engaged surfaces of the relatively moving members $35^l$—$39^l$—$99$—$30^l$. This "one way" friction check action is not however essential to the proper performance of the supplemental-complemental (series parallel) spring combination that constitutes the main part of my improved organization; and that action may, as in previous cases, be either utilized or dispensed with, as circumstances may require.

The construction to be next considered (that shown in the single view of Fig. 30) resembles in many detail respects, the construction last described. It comprises a body bracket $48^k$ which has two downwardly projecting side bars, $60^k$, that closely embrace the outer faces of the U-shaped link $14^k$; and a broad flexible band $7^k$ which connects the cross bar of this link with the base of the bracket $48^k$;—the whole constituting a vertically flexible, but laterally rigid, guide connection, between the body member $48^k$ and the adjacent main spring eye on which the link $14^k$ is pivotally mounted. The range of free vertical movement that is allowed by this connection is limited by the cross bars at the ends of the guide plates $60^k$; and this range is, as in previous cases, preadjusted to obtain the desired ratio between the series-suspension action and the parallel-reinforcement action of the supplemental spring unit of the combination. This unit consists of a single volute coil spring $24^k$, which is supported on the main-spring-axle bracket $26^k$; a multiple leaf spring $79^k$ which is connected at its inner end to the link $14^k$ by the swinging shackle $68^k$; and a lever member $30^k$, which is fulcrumed on the cross bolt $33^k$ of the body bracket $35^k$, which is bolted, at its opposite extremity, to the base of the spring $79^k$, and which is also pivotally connected, at an intermediate point, with the upper head or cap, $27^k$, of the spring $24^k$. The cap $27^k$ is provided with a tubular extension, $97^k$, which is adapted to receive the coned head of a bolt $98^k$, that is riveted into the lower bracket support $26^k$; and a tapered split collar, $39^k$ is preferably interposed between the coned head of the bolt $98^k$ and the wall of the tubular extension $97^k$. This mechanism also includes a slotted block $41^k$, which engages the top and side edges of the supplemental leaf spring $79^k$, and which is shackled to the main spring-axle-bracket $26^k$ by the telescoping link elements $99^k$—$100$.

The operation of this eleventh illustrative embodiment of my invention is as follows: When the parts are in static equilibrium both of the supplemental springs are maintained under a predetermined initial tension—(by the conjoint stop action of the telescopic connections, $97^k$—$98^k$, and $41^k$—$99^k$—$100$)—that is sufficient to support all that part of the normal load that is ordinarily transmitted to the inner end of the front side leaf main spring 2. When the system is compressed the lever $30^k$ is maintained in its normal load position by contact engagement of its inner end with the under side of the body frame; the supplemental coil spring $24^k$ is subjected to a linear compression which is equal to the linear approach of the body and axle parts; and the supplemental leaf spring $79^k$ is also subjected to an increased flexure by the relative upward movement of the main spring guide link $14^k$ and the shackle connection $68^k$. Both supplemental springs $24^k$ and $79^k$ therefore act in series-suspension relation to the main spring 2, until the central bosses of the link, $14^k$, engage with the upper cross bar of the guide frame $60^k$, after which the three springs act in parallel-reinforcement relation. During the approach movement of the parts the bolts $98^k$—$100$ slide freely upward in their associated connection elements $97^k$—$99^k$; and the split collar $39^k$— which is loosely pinned to the bolt $98^k$ and moves upward therewith—is relieved of expansion pressure. But when the closing movement is arrested, the reaction of the flexed springs moves the parts $97^k$, and $39^k$—$98^k$ in opposite directions and expands the split collar against the contiguous surface of the tubular extension $97^k$; and the frictional engagement of these relatively moving parts retards and damps the recoil action. When the system is expanded from normal load position, the expanded and tensioned connection $97^k$—$98^k$, imposes a clockwise rotation on the lever $30^k$ and thereby subjects the leaf spring $79^k$ to a greatly magnified flexural strain, which is transmitted, in series, to the shackle and link connection $68^k$—$14^k$, and thence to the free end of the main spring. This series-suspension action continues until the relative downward movement of the linkage $14^k$—$7^k$ brings the hubs of the link $14^k$ into engagement with the lower cross bar of the guide frame $60^k$ (see dotted line positions R—R—$r$—$r$) and thus changes the series-suspension relationship of the parts into a parallel-reinforcement conjunction. The magnified angular movement of the lever-spring elements $30^k$—$79^k$ allows the slotted block and shackle connection, $41^k$—$99^k$—$100$, to be drawn inwardly by the tension spring $40^k$ (as shown in dotted lines in Fig. 30); and when the return movement, toward normal load position, is initiated, the rapid recoil of the resilient support members is restrained and controlled by the frictional grip of the sliding block 41$^k$ on the face and edges of the leaf spring 79$^k$.

In the exemplification of my improvements which is shown in Fig. 31 two counteracting leaf springs, 24$^m$ and 79$^m$ are used as the supplemental-suspension-complemental-reinforcement elements of the system. The first of these elements is rigidly secured, at its base, to the body bracket 26$^m$ and is pivotally connected at its outer end to the upper ends of the links 36$^m$ by the cross bolt 31$^m$. The other secondary leaf spring is pivotally coupled to the inner eye of the main spring 2, by the eye bolt 17$^m$, and is bolted, at its base, to the lever element 30$^m$, that is shackled to the central portion of the main spring by the swinging links 75$^m$ and the clip bracket support 35$^m$. The outer extremity of this lever is pivotally coupled to the lower ends of the links 36$^m$, and it is also preferably provided with a U-shaped thumb-latch 39$^m$ that is pressed outwardly, into engagement with the edges of the said links, by the flat spring 40$^m$. The cross bolt connection 31$^m$ slides in the depending slotted arms 49$^m$ of the body bracket 26$^m$ and is limited in its movement by the ends of the slots through which it passes. In the normal load position of the parts the outer end of the lever 30$^m$ is in engagement with the upper face of the main spring, and the cross bolt 31$^m$ is at the lowest limit of its arcuate movement in the said slots; and the supplemental suspension element 24$^m$ is then under sufficient initial tension to maintain the system in static equilibrium. When the normal load is augmented by a kinetic compression stress, the lever-spring elements 30$^m$—79$^m$, and the links 36$^m$ are moved bodily—as a unit—toward the dotted line position C—C; and the initial-suspension-strain in the supplemental spring 24$^m$ is correspondingly increased to balance the added load. As the axle and main spring members continue to approach the body members, the widened head of the main spring guide link 14$^m$ engages with the adjacent face of its solid companion link 7$^m$; and the vertically flexible guide connection, 7$^m$—14$^m$—20$^m$, is then converted into a longitudinally rigid compression-shackle that will transmit a load stress from the body bolt 11$^m$ directly to the main spring eye bolt 17$^m$. The primary and secondary springs are thus put in parallel, and are conjointly and equally flexed by any further closing movement of the spring supported parts. When the system is subjected to a rebound or expansion stress, the compression resisting spring 24$^m$ and the link connections 36$^m$, are held in normal load position by the engagement of the cross bolt 31$^m$ with the extremities of the slotted arms 49$^m$; and the relative downward movement of the axle and main spring members rocks the lever-spring elements, 30$^m$—79$^m$, in a clockwise direction, on their shackle supports 75$^m$—35$^m$ (toward the lower dotted line position R—R—R, etc.) and thus rapidly and progressively magnifies the initial flexure of the secondary suspension element 79$^m$. The increased strain in this spring is directly transmitted, in series, to the eye bolt connection 17$^m$ and serves to impart an increased flexure to the inner portion of the main spring 2, and thus accelerate, or rather accentuate, its movement away from the body. This movement is ultimately arrested by the engagement of the lower edge of the link (head) 14$^m$, with the stop extension 23$^m$ of the link 7$^m$; and this engagement converts the guide linkage frame into a rigid tension shackle that is adapted to hold the spring eye bolt support 17$^m$ at a fixed distance from the body bolt support 11$^m$. The further expansion of the system is then restrained by the parallel operation of the primary and secondary springs, 2 and 79$^m$, both of which now react directly on the body member through this fixed shackle connection.

The thumb latch elements 39$^m$—40$^m$ are provided for the purpose of securing some frictional damping action on the recoil of the resilient support elements from either position of compression or expansion displacement. When the parts are moved from the full line position, N, to the upper dotted line position, C, the link arms 36$^m$ are rocked backward with respect to the lever 30$^m$; and when the rebound or expansion movement—from N to R—occurs, the said lever is rocked forward, relatively to the said arms, to an even greater degree. This relative angular movement, of the last mentioned members, permits the spring 40$^m$ to push the thumb latch 39$^m$ into a more nearly radial or perpendicular relationship to the arms 36$^m$; and the frictional grip of the latch ends on the edges of the links presents a substantial check to the sudden recoil of the parts to normal load position. This friction check device, may, however, be omitted without affecting the characteristic performance of the remaining elements of the combination, in cushioning and absorbing the lighter shocks and jars by a sensitive series-suspension-action, and in restraining and compensating the effects of excessive stresses and strains by a more energetic parallel-reinforcement-action of the elastic elements.

The final exemplification of my improvements—which is depicted in Figs. 32 to 34 inclusive—is somewhat different in appearance from any of the previously described forms of construction; but it embodies the same general features of structure and operation as are found in all examples of my present invention. In the organization here shown a single double acting volute coil spring $24^n$ is employed to cooperate, successively in series and in parallel, with the main spring 2, in restraining and checking the movements of the parts in either direction from normal load position. This supplemental coil spring is mounted in a closed cell, which comprises the lower cylinder 101 that is secured to the axle main spring bracket $26^n$, and an upper flanged sleeve 102 that telescopes over the exterior of the cylinder 101, and is slidably confined within the body bracket $35^n$. The sleeve 102 is provided with a vent opening 103 which, in the normal load position of parts (Fig. 32), is in registry with a corresponding opening in the bracket cap $35^n$; and this latter opening is controlled by an outwardly swinging flap valve 104. The lower cylinder contains a piston $51^n$, which is fitted closely therein, and which is provided with a downwardly opening valve $53^n$; and a central stem $98^n$ is secured in the lower bracket $26^n$ and projects upwardly through the valve and piston elements $51^n$—$53^n$. The top of this stem carries a cross bar 105; and the upper bracket cap $35^n$ is provided with a pair of downwardly extending slotted arms $49^n$—$49^n$ which receive and guide the ends of a cross pin $31^n$. This pin carries a pair of independently rotatable pulley elements, each of which comprises a cylindrical drum $30^n$ and a larger quadrantal sector $30^p$, and constitutes in effect, a lever member of the first class. The grooved peripheries of the drums $30^n$ are connected, at diametrically opposite points, with the cross bar 105, by means of the flexible chains, or cords, $36^n$—$36^n$; and the opposed sectors $30^p$—$30^p$ are correspondingly coupled to the piston $51^n$ by the chains or cables $36^p$—$36^p$. The space within the cylinder 101 is preferably filled with a thick viscous oil or grease similar in character to that used in the plunger 51 of the third illustrative embodiment of my invention. The outer end of the main spring 2 is operatively connected to the body hanger bolt $11^n$ by the laterally rigid linkage frame $7^n$—$20^n$—$14^n$ that permits the said end to move freely, in a vertical plane, through the range N—C', N—R, but which is converted into a longitudinally rigid shackle link at these two extremities of movement.

The functional action of the organization shown in the last four figures of my drawings is as follows: When the parts are in normal load position the adjacent flanged ends of the telescopic sleeves, 101—102, are in tensioned engagement; the upper flanged end of the top sleeve, 102, bears on the base of the cup shaped body bracket $35^n$; the piston member $51^n$ rests on the end support of the cylinder 101; and the supplemental coil spring is confined, between the said piston and the top flange of the sleeve 102, under sufficient initial tension to support that part of the static load which would ordinarily be transmitted to the outer end of the main spring from the body hanger 6. When this load stress is kinetically augmented the end supports of the supplemental spring $24^n$ are pushed together and the said suspension element is subjected to such increased strain as is necessary to balance the kinetic load. During this compressive movement the parts, $26^n$—$51^n$—$98^n$—101—105, all move as a unit, carrying with them the pulley and chain connections, $31^n$—$30^{np}$—$36^{np}$. But when the parts expand from normal load position, the engagement of the flanged ends of the sleeves 101—102, pulls the entire supplemental spring cell away from the body bracket $35^n$, while the fulcrum pin $31^n$ is maintained in fixed relation thereto by the bracket arms $49^n$. The relative separation of the pin and pulley elements, $31^n$—$30^n$—$30^p$, from the lower cylinder members $98^n$—105, imposes a pull on the chain elements $36^n$—$36^n$ and produces a reverse rotation on the two drums $30^n$—$30^n$; and the concurrent movement of the attached sectors $30^p$—$30^p$ and of the chains $36^p$—$36^p$ secured thereto, produces a magnified motion of the piston $51^n$ away from the lower support $26^n$. These opposed movements of the top and bottom supports, 102 and $51^n$, or the coil spring, $24^n$, subject the latter to a rapidly increased flexure which is substantially three times as great as that produced by an equal linear movement of approach of the body and axle members. The expansion of the system is therefore vigorously restrained by the magnified flexural action of the same supplemental spring as is used in directly resisting and checking the compression movements. The unit elastic resistance of the double-acting suspension coil is sufficient to cushion and absorb the effects of any ordinary compression or expansion stress; but when the system is subjected to a very unusual or severe shock, the corresponding approach or separation of the body and main spring parts will bring the linkage elements, $7^n$—$14^n$, to the limit of their free relative movement—i. e., to piston C' or R—and when this occurs the main spring eye bolt $17^n$ is coupled to the body bolt $11^n$ by a longitudinally rigid shackle, that compels the primary suspension element 2, to act in parallel with the secondary coil element, $24^n$.

The recoil of the flexed springs, from a position of compressive displacement, is retarded and controlled by the action of the air valve 104. When the cap $35^n$ is forced toward the lower cylinder, the air in the upper part of the spring cell is allowed to escape freely through this outwardly opening valve; but when the return movement begins the valve closes and the continuation of the movement produces a substantial reduction of pressure, or a partial vacuum (sic), in the expanding space which pneumatically resists the recoil of the parts. The reaction of the flexed members from an expanded position is similarly damped by a hydraulic dash pot action of the piston $51^n$ in the oil filled cylinder 101. When the piston is moving upwardly in this cylinder—toward the rebound position (R) of Fig. 33—the valve $53^n$ opens freely to allow the passage of the liquid to the space below the piston; but when the reverse movement begins the valve immediately closes and the parts can only return to normal load position at such a rate as will be permitted by the flow of the oil through the bearing clearance between the piston and the members $98^n$ and 101. As will readily be noted the damping of either return movement may be readily varied in degree, or eliminated entirely, by modifying, or omitting, one or the other, or both, of the valves 104 and $53^n$. The recoil of the parts from the expanded position may also be controlled by removing the liquid from the lower cylinder and utilizing the trapped air therein as a pneumatic check; but the use of the oil is an advantage both in reducing the air space in the upper part of the cell and also in providing a continuous and efficient lubrication of all of the relatively movable parts of the supplemental spring mechanism.

The preceding disclosure of various exemplary forms of my improved type of shock absorber construction will be sufficient to enable those skilled in the art to fully understand the generic principles of operation that are characteristic of this invention, and to utilize those principles in the application of my improvements—in whole or in part as may be desired—to many other types of vehicle suspension systems, and to many varied arrangements of chassis members. I consider this improved type of suspension-reinforcement construction—in which supplemental spring units are successively used in series and in parallel relationship to the ordinary main spring unit—as particularly advantageous for large heavy motor vehicles; and I have, therefore, illustrated it as applied to side leaf springs of the semi-elliptic and three-quarter elliptic form. But it will be understood that it can be equally well applied to full elliptic springs or cross leaf springs such as are employed on the lighter or less expensive forms of road vehicles; or that the system may, on the other hand, be adapted for use with exceedingly stiff composite spring suspensions such as are used on railway cars, etc.

In the general description of the present invention, I have used the terms "dual-acting" spring element, "dual-acting" spring unit, etc., to generically include double-acting single spring, and double-acting multiple spring, constructions (such as are shown, for example, in Figs. 1 to 16, and 32 to 34), and to also include an assemblage of two or more counteracting springs (e. g., such as are illustrated in Figs. 19 to 31 inclusive), or any equivalent combination of resilient elements which is adapted to elastically resist all movements of the spring supported parts away from the normal load position of static balance. I have also used the term, vertically flexible but laterally, or transversely, rigid guide connection, to generally designate any, and all, devices (e. g., those herein shown) for conjoining one part of one of the spring members to an adjacent chassis member, in such manner that the connected members may move freely up and down with respect to each other—through a predetermined range—but cannot have any relative lateral movement, or side sway, out of that plane of free vertical oscillation. The expressions "in series", or "in series relationship," etc., are used, in the ordinary technical sense, to indicate an arrangement of parts in which a stress or strain is transmitted, as an entirety, from the one part to and through the other (or vice versa); and the contrasting phrases "in parallel" or "in parallel relation", are correspondingly used in the engineering (and not in the geometric) sense to designate a combination of mechanical elements in which the stress or strain is distributed between the coacting parts, in varying proportions, without any direct action or reaction of the one on the other. These terms have in fact the same technical significance—as applied to the relationship between the spring elements of my improved supplemental-complemental-suspension system—as they have when used in designating current transmitting systems; and any other descriptive terms, which I have used herein, are to be given such meaning as will comport with the nature of the disclosure and the context of the technical language used in connection therewith. With this understanding, what I claim is:—

1. A shock absorber organization for two relatively movable members which comprises a primary spring unit, a secondary spring unit, and means conjoining said members with said springs whereby the latter may act successively in series and in parallel to elastically resist movement in either direction from static balance.

2. A shock absorber for vehicles which comprises a main spring, a supplemental spring mounted in series therewith, and means for bringing the main spring into parallel operative relationship with the supplemental spring when the latter has been flexed to a predetermined degree by either a closing or a rebound movement of the vehicle parts.

3. An elastic suspension organization for relatively movable parts, which comprises the combination of a main spring, a supplemental spring, and means for operatively connecting said parts with the said springs and constraining the latter to act successively in series and in parallel with each other when the parts expand from normal load position.

4. A shock absorber construction for two relatively movable members which comprises a main spring, a secondary spring suspension for supporting the normal load on one extremity thereof, and means for connecting said springs in parallel reinforcement relationship whenever the said members have been displaced a predetermined distance from normal load position.

5. An elastic suspension system for vehicle bodies which comprises a primary resilient unit, a secondary resilient unit normally connected in series therewith, means for imposing an increased flexure on the secondary unit whenever the vehicle body moves in either direction from normal load position, and means for connecting the primary unit in parallel-reinforcement-relation to the secondary unit when the latter has been flexed to a predetermined degree.

6. A shock absorber mechanism for vehicles which comprises a main spring, a supplemental spring, means conjoining said supplemental spring with the relatively movable vehicle members whereby it is increasingly flexed by movements of the said members in either direction from static load position, and means for operatively connecting the main spring in parallel with the supplemental spring when the said movements exceed a predetermined amplitude.

7. In a suspension system for two relatively movable parts, the combination, of a plurality of resilient support elements for elastically restraining any displacement of the parts from static balance position, and means for successively connecting said elements in series-suspension and in parallel-reinforcement relationship to each other.

8. In a suspension system for two relatively movable members, the combination of two or more resilient supports therefor, means for progressively increasing the elastic flexure of one of said supports when the said members are moved in either direction from normal load position, and means for flexing another of the said supports in parallel-reinforcement of the first when the movement has exceeded a predetermined amplitude.

9. In a shock absorber organization for vehicles the combination of a main spring, a supplemental spring arranged in series therewith, means for progressively increasing the flexure of said supplemental spring by a displacement of the vehicle parts in either direction from normal load position, and a vertically flexible but laterally rigid connection between the main spring and one of the vehicle parts.

10. In a suspension system for two relatively movable members the combination of a main spring unit, a dual-acting supplemental spring unit arranged in series with said main spring, means conjoining same members with the said supplemental unit whereby the latter is increasingly flexed by both compression and rebound movements of the system, a vertically flexible but laterally rigid guide means for operatively connecting the main spring to one of said members; and stop means for converting said vertically flexible guide into a longitudinally rigid shackle member.

11. An elastic suspension system for vehicles which comprises a plurality of resilient support elements, means for increasing the flexure of one of these elements whenever the suspended vehicle parts move away from normal load position, and means for connecting another of these elements to a vehicle member whereby the said resilient supports are constrained to act in series-suspension relation at certain predetermined positions of the vehicle parts, and in parallel-reinforcement relation at other positions thereof.

12. In a shock absorber organization for relatively movable members the combination of a primary spring unit, a dual-acting secondary spring unit, mechanism for conjoining the said members and the secondary unit whereby the latter is subjected to increased flexural strain by any movement of the members away from the point of static balance, means for conjoining the said flexed secondary unit successively in series and in parallel with the primary spring, and means for positively arresting the flexure of the secondary unit at a predetermined point in the said movement.

13. In an elastic suspension system for vehicles the combination of a plurality of spring supports, means for successively connecting said supports in series and in parallel to elastically resist a movement of the vehicle parts away from normal load position, and means for retarding or damping the recoil of the parts toward normal load position.

14. An elastic suspension system for relatively movable members which comprises a plurality of spring support elements, a mechanism for operatively connecting said elements successively in series and in parallel and conjointly flexing them by the movement of the said members, and means for frictionally damping the reaction or recoil of the flexed elements.

15. An elastic suspension system for vehicles which comprises the combination of a main spring unit and a supplemental spring unit, means for imposing a flexural strain on the supplemental spring unit when the system is compressed, other means for imposing a relatively magnified strain on the same unit when the system rebounds beyond normal load position, and means for operatively connecting the main spring unit in parallel-reinforcement relation with the supplemental unit at predetermined points in the flexure of the latter.

16. A shock absorber organization for relatively movable members which comprises two or more spring supports, means conjoining said members with one of said supports whereby this support is subjected to an increased flexural strain by the relative approach of said members and is subjected to a more rapidly increased strain by the relative separation thereof, other means for operatively connecting another of said supports in parallel-reinforcement relation to the first named support at a predetermined point in the flexure of the latter, and a friction check mechanism for retarding the normal recoil or reaction of the flexed springs.

17. In a spring support system for vehicles the combination of a main spring unit a supplemental spring unit, means for operatively connecting said units successively in series-suspension and in parallel-reinforcement relation to the relatively movable vehicle parts, a dual-acting mechanism whereby the connecting springs are subjected to different degrees of flexural strain when the system is successively compressed and expanded from normal load position, stop devices for arresting the flexural movement of one or both of the said units at a predetermined position of the parts, and a one way check mechanism for damping the recoil or reaction of the flexed springs.

18. An elastic suspension system for relatively movable members which comprises a plurality of spring units, a dual-acting mechanism conjoining said members with one of said units whereby the latter is subjected to an increased stress when the members move toward each other and to a more rapidly increased stress when they separate or rebound beyond the point of static balance, a vertically flexible but laterally rigid connection between one of said members, and another of said spring units, and limiting stop devices whereby said connection is converted into a longitudinally rigid shackle at predetermined points in the aforesaid movement.

19. In an elastic shock absorbing system for vehicles the combination of a relatively stiff main spring rigidly secured to one of the relatively movable vehicle members, a vertically flexible but transversely rigid guide connection between this main spring and the other of said members, a supplemental spring unit in series-suspension relation to the said main spring, a dual-acting mechanism for variably flexing this supplemental spring unit when the vehicle members move in opposite directions from normal load position, means for converting the series-suspension relation into a parallel-reinforcement relation at a predetermined point in the flexure of the springs, means for positively arresting said flexure at a predetermined displacement of the members, and a friction check mechanism for damping the recoil of the flexed resilient elements and thereby retarding the return of the displaced members to static balance relation.

20. An elastic suspension system for vehicle bodies which comprises a relatively stiff main spring rigidly secured to the running gear of the vehicle, a relatively flexible supplemental spring unit normally connected in series with this main spring, a dual-control connection between said supplemental unit and the body and running gear parts, whereby the more flexible spring is subjected to increased flexure when the said parts are moved in either direction from normal load position, a vertically flexible but transversely rigid guide connection between the main spring and the body parts, and means for arresting the relative vertical movement of the said main spring and body parts at predetermined points in the position of the said guide connection.

21. In a spring suspension system for two relatively movable members the combination of a main spring rigidly secured to one of said members, a vertically flexible linkage connection between said spring and the other of said members, a stop for limiting the relative vertical movement of the linkage elements, a supplemental spring unit operatively connected to both of said members and maintained under such initial tension as to normally support them in static balance relation, and an actuating mechanism whereby the initially tensioned supplemental unit is subjected to an increased flexural strain when the parts are displaced from the position of static balance.

22. In an elastic suspension system for vehicles the combination of a relatively stiff main spring rigidly secured to the axle member of the vehicle, a vertical guide unit comprising a pair of rotatably coupled link arms operatively connected at their opposed extremities to the said main spring and to the body member, means for arresting the relative rotation of the said link arms at predetermined points in the movement and thereby converting said guide unit into a longitudinally rigid shackle coupling, a supplemental spring interposed between the main spring and the body and maintained under such initial tension as to normally support the body in normal load position, and means for producing an increased flexure of this initially tensioned spring when the axle and body members move in either direction from said normal load position.

23. In an elastic suspension system for the body and axle members of a vehicle the combination of a main spring rigidly secured on one of said members, a vertically flexible but laterally rigid guide connection between the main spring and the other of said members, means for limiting the relative vertical movement of the guide connected parts, a relatively flexible supplemental spring unit normally maintained in series-suspension relationship to the main spring and acting to support the parts in the position of static balance, and an actuating lever system operatively interposed between the supplemental unit and the said vehicle members and serving to progressively increase the supplemental spring tension when the members are displaced from the said position.

24. In an elastic suspension system for vehicles the combination of a plurality of spring supports, means for successively conjoining these supports in series-suspension and in parallel-reinforcement relationship to the relatively movable vehicle members, and an actuating lever mechanism operatively connected at a plurality of points with the said members, whereby the conjoined spring supports are subjected to increased flexural stress when the members move in either direction from normal load position.

25. In a shock absorber construction for vehicles the combination of a relatively stiff main spring secured to the axle member of the vehicle, a vertically flexible but laterally rigid guide means for connecting said springs to the body member thereof, stop means for limiting the vertical flexing movement of the said guide means, a lever-actuated supplemental spring unit interposed between the guide connected parts, and a plurality of operative connections between the said lever and the body and axle members, whereby the supplemental spring unit is increasingly flexed whenever the said members are moved away from normal load position.

26. An elastic suspension system for two relatively movable members which comprises a relatively stiff main spring, a plurality of relatively flexible supplemental springs, means for connecting the said supplemental spring successively in series and in parallel relationship to the main spring, and a dual-acting system of connections between the relatively movable members and the supplemental springs whereby the latter elements are differentially flexed when the said members are displaced from normal load position.

27. In an elastic suspension system for vehicles the combination of a plurality of springs, means for conjoining these springs successively in series-suspension and in parallel-reinforcement relationship with the relatively movable vehicle members, a pair of spring actuating levers, and a dual system of connections between the said members and the said levers, whereby the latter are moved alternately by the respective compression and expansion of the system from normal load position.

28. In an elastic suspension system for two relatively movable members the combination of a relatively stiff main spring, a vertically flexible connection between the said spring and one of the said members, a relatively flexible supplemental spring, a dual-acting lever system conjoining the supplemental spring and both of the said members whereby the last mentioned spring is subjected to a magnified flexure whenever the system is compressed or expanded from the position of static balance.

29. In an elastic suspension system for vehicles the combination of a main spring secured to one of the relatively stiff movable vehicle members, a vertically free connection between said spring and the other of the said members, stops limiting the vertically free action of the said connection, a supplemental spring, and a lever system conjoining the aforesaid vehicle members with the said supplemental spring and acting to subject the latter to increased flexure when the parts are displaced in either direction from normal load position.

30. An elastic suspension system for vehicles which comprises a plurality of springs, a vertically free but laterally rigid connection between one of said springs and an adjacent member of the vehicle chassis, an actuating lever system conjoining another of the said springs with two relatively movable vehicle members, and a friction check device for damping the movements of the said lever system.

31. An elastic suspension system for vehicles which comprises a plurality of springs interposed between the body and axle members thereof, a vertically free connection between one of said springs and one of said members, stops limiting the range of free relative movement between these connected parts, an actuating lever mechanism conjoining another of the said springs with both of said members, and a friction check mechanism for damping the recoil movement of the lever actuated spring.

32. In a shock absorber organization for two relatively movable members the combination of a main spring rigidly secured to one of said members, a vertically flexible connection between this spring and the other of said members, a plurality of counteracting springs, and an actuating lever mechanism conjoining both of said members with the last mentioned springs whereby the latter are alternately subjected to increased flexural strain by the respective approach and separation of the aforesaid members.

33. An elastic suspension system for vehicles which comprises a main spring, a vertically flexible guide connection between the said spring and one of the vehicle members, a supplemental spring adapted to resist the compression of the system, a counteracting secondary spring adapted to resist the expansion thereof, and actuating means whereby the flexure of the two last mentioned springs is alternately and differentially increased by the respective approach and separation of the vehicle members from normal load position.

34. In an elastic suspension system for vehicles the combination of a relatively stiff main spring secured to the axle member, a vertically flexible but laterally rigid guide linkage conjoining the said spring with the body member, a relatively flexible supplemental spring in normal series-suspension relation with the main spring, actuating means whereby this spring is increasingly flexed by the relative approach of the body and axle members, a counteracting secondary spring also arranged in normal series-suspension relationship to the main spring, other actuating means whereby the last mentioned spring is progressively stressed by the expansion of the said members beyond normal load position, and means for limiting the free vertical movement of the guide linkage connection whereby the main spring is placed alternately in parallel-reinforcement relation with the said supplemental spring and with the counteracting secondary spring.

35. In a shock absorber organization for vehicles the combination of a main spring, suspension means whereby said main spring is normally supported by a supplemental resilient element interposed between it and a relatively movable member of the vehicle chassis, an actuating means whereby the normal tension of the supplemental suspension element is progressively increased by the bodily movement of the said main spring toward said vehicle member, a stop for arresting this bodily movement and thereby placing the main spring and its supplemental suspension element in parallel-reinforcement relation, a counteracting spring, actuating means for maintaining said counteracting spring under a predetermined initial tension, and for progressively increasing this tension when the main spring and vehicle members rebound from normal load position, and a friction check device for damping the recoil of the flexed counteracting spring.

36. In an elastic suspension system for vehicles the combination of a primary spring, two counteracting secondary springs, means for maintaining each of these counteracting springs under a predetermined initial tension, actuating mechanism whereby each of the said springs is separately subjected to an increased flexural stress by opposite displacements of the system from normal load position, and connection means whereby the primary spring is placed successively in series-suspension and in parallel-reinforcement relation to one of the secondary springs as the amplitude of the compressive displacement is increased and is reciprocally placed in successive series and parallel relationship with the other of said secondary springs by the reverse rebound movement of the system.

37. A shock absorber organization for two relatively movable vehicle members which comprises a main spring unit, a supplemental spring unit interposed between said main spring unit and one of said vehicle members, means for progressively increasing the elastic flexure of said supplemental unit whenever the said vehicle members are displaced from normal load position, and means for damping the elastic recoil of the spring system toward normal load position.

38. An elastic suspension system for vehicles which comprises, a plurality of resilient support elements interposed between the body and axle members, means for progressively increasing the elastic flexure of one of said elements whenever the said members are moved in either direction from normal load position, and other means for frictionally retarding the elastic reaction or recoil of the flexed elements toward normal load position.

39. A shock absorber organization for two relatively movable members which comprises, a primary spring unit, a secondary spring unit, means conjoining said members with the said secondary unit whereby the latter may act to elastically resist movement in either direction away from normal load position, and other means for resisting the elastic recoil of the said spring units toward normal load position.

40. An elastic suspension system for vehicle bodies which comprises, a primary spring unit, a secondary spring unit normally connected in series therewith, means for imposing an increased flexure on the secondary unit whenever the vehicle body moves in either direction from normal load position, and means for damping the elastic recoil or return of the flexed unit toward normal load position.

In witness whereof, I have hereunto set my hand and seal at Pittsburgh, Pennsylvania, this seventh day of February, A. D., one thousand nine hundred and twenty-one.

FRANK L. O. WADSWORTH. [L. S.]